United States Patent
Baldwin et al.

(10) Patent No.: US 12,052,310 B2
(45) Date of Patent: **\*Jul. 30, 2024**

(54) ORIGIN SERVER CLOAKING USING VIRTUAL PRIVATE CLOUD NETWORK ENVIRONMENTS

(71) Applicant: Amazon Technologies, Inc., Seattle, WA (US)

(72) Inventors: Matthew Graham Baldwin, Edmonds, WA (US); Craig Wesley Howard, Seattle, WA (US); Donavan Miller, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 73 days.

This patent is subject to a terminal disclaimer.

(21) Appl. No.: 17/168,023

(22) Filed: Feb. 4, 2021

(65) Prior Publication Data

US 2021/0185114 A1    Jun. 17, 2021

Related U.S. Application Data

(63) Continuation of application No. 15/419,880, filed on Jan. 30, 2017, now Pat. No. 10,938,884.

(51) Int. Cl.
H04L 12/46    (2006.01)
H04L 9/40    (2022.01)
(Continued)

(52) U.S. Cl.
CPC .......... *H04L 67/06* (2013.01); *H04L 12/4633* (2013.01); *H04L 12/4641* (2013.01);
(Continued)

(58) Field of Classification Search
None
See application file for complete search history.

(56) References Cited

U.S. PATENT DOCUMENTS 1,075,551 A    10/1913    D'Amours
5,063,500 A    11/1991    Shorter
(Continued)

FOREIGN PATENT DOCUMENTS

CA    2741 895 A1    5/2010
CA    2765397 A1    2/2011
(Continued)

OTHER PUBLICATIONS

Afergan et al. (AU-2003248856-A1); Akamai Tech Inc; retrieved from FIT database. (Year: 2003).*
(Continued)

*Primary Examiner* — Dhairya A Patel
*Assistant Examiner* — Sandarva Khanal
(74) *Attorney, Agent, or Firm* — Knobbe, Martens, Olson & Bear, LLP

(57) ABSTRACT

An origin server that is implemented within one or more devices within a third party virtual private cloud (VPC) is provided herein. Instead of communicating with various CDNs over a public network, the third party VPC may instead communicate with a managed VPC via a private network. Thus, no gateway, network address translation (NAT), or other such devices may be needed for the third party VPC and the managed VPC to communicate. Rather, a VPC identifier of the managed VPC and a VPC identifier of the third party VPC are used to pair the two VPCs. Once paired, a private route is set up such that points from the private address space of the third party VPC to the private address space of the managed VPC. The managed VPC then communicates directly with the various CDNs via a public network.

20 Claims, 4 Drawing Sheets

(51) Int. Cl.
*H04L 67/06* (2022.01)
*H04L 67/10* (2022.01)
*H04L 67/146* (2022.01)
*H04L 67/53* (2022.01)
*H04L 67/568* (2022.01)

(52) U.S. Cl.
CPC ...... *H04L 63/0272* (2013.01); *H04L 63/0428* (2013.01); *H04L 67/10* (2013.01); *H04L 67/146* (2013.01); *H04L 67/53* (2022.05); *H04L 67/568* (2022.05)

(56) References Cited

U.S. PATENT DOCUMENTS

| | | |
|---|---|---|
| 5,341,477 A | 8/1994 | Pitkin et al. |
| 5,459,837 A | 10/1995 | Caccavale |
| 5,611,049 A | 3/1997 | Pitts |
| 5,627,889 A | 3/1997 | Eslambolchi |
| 5,701,467 A | 9/1997 | Freeston |
| 5,764,910 A | 6/1998 | Shachar |
| 5,774,660 A | 6/1998 | Brendel et al. |
| 5,815,649 A | 9/1998 | Utter et al. |
| 5,852,717 A | 11/1998 | Bhide et al. |
| 5,892,914 A | 4/1999 | Pitts |
| 5,893,116 A | 4/1999 | Simmonds et al. |
| 5,895,462 A | 4/1999 | Toki |
| 5,905,248 A | 4/1999 | Russell et al. |
| 5,933,811 A | 5/1999 | Angles et al. |
| 5,937,427 A | 8/1999 | Shinagawa et al. |
| 5,974,454 A | 8/1999 | Apfel et al. |
| 5,991,306 A | 10/1999 | Burns et al. |
| 5,991,809 A | 11/1999 | Kriegsman |
| 5,999,274 A | 11/1999 | Lee et al. |
| 6,006,264 A | 12/1999 | Colby et al. |
| 6,016,512 A | 1/2000 | Huitema |
| 6,026,452 A | 1/2000 | Pitts |
| 6,085,234 A | 1/2000 | Pitts et al. |
| 6,038,601 A | 2/2000 | Lambert et al. |
| 6,052,718 A | 3/2000 | Gifford |
| 6,078,960 A | 4/2000 | Ballard |
| 6,018,619 A | 6/2000 | Allard et al. |
| 6,092,100 A | 7/2000 | Berstis et al. |
| 6,098,096 A | 7/2000 | Tsirigotis et al. |
| 6,108,703 A | 8/2000 | Leighton et al. |
| 6,128,279 A | 8/2000 | O'Neil et al. |
| 6,151,631 A | 10/2000 | Ansell et al. |
| 6,157,942 A | 11/2000 | Chu et al. |
| 6,167,438 A | 12/2000 | Yates et al. |
| 6,167,446 A | 12/2000 | Lister et al. |
| 6,173,316 B1 | 1/2001 | De Boor et al. |
| 6,178,160 B1 | 1/2001 | Bolton et al. |
| 6,182,111 B1 | 1/2001 | Inohara et al. |
| 6,182,125 B1 | 1/2001 | Borella et al. |
| 6,185,598 B1 | 1/2001 | Farber et al. |
| 6,192,051 B1 | 2/2001 | Lipman et al. |
| 6,205,475 B1 | 2/2001 | Pitts |
| 6,223,288 B1 | 3/2001 | Byrne |
| 6,223,209 B1 | 4/2001 | Watson et al. |
| 6,243,761 B1 | 4/2001 | Mogul et al. |
| 6,275,496 B1 | 6/2001 | Burns et al. |
| 6,256,671 B1 | 7/2001 | Strentzsch et al. |
| 6,286,043 B1 | 8/2001 | Cuomo et al. |
| 6,286,084 B1 | 9/2001 | Wexler et al. |
| 6,304,913 B1 | 9/2001 | Rune |
| 6,324,580 B1 | 10/2001 | Jindal et al. |
| 6,330,602 B1 | 11/2001 | Law et al. |
| 6,338,082 B1 | 1/2002 | Schneider |
| 6,345,308 B1 | 1/2002 | Abe |
| 6,351,743 B1 | 2/2002 | DeArdo et al. |
| 6,351,775 B1 | 2/2002 | Yu |
| 6,363,411 B1 | 2/2002 | Dugan et al. |
| 6,366,952 B2 | 3/2002 | Pitts |
| 6,374,290 B1 | 4/2002 | Scharber et al. |
| 6,377,257 B1 | 4/2002 | Borrel et al. |
| 6,386,043 B1 | 4/2002 | Millins |
| 6,389,532 B1 | 5/2002 | Gupta et al. |
| 6,405,252 B1 | 5/2002 | Gupta et al. |
| 6,408,360 B1 | 6/2002 | Chamberlain et al. |
| 6,411,967 B1 | 6/2002 | Van Renesse |
| 6,415,280 B1 | 6/2002 | Farber et al. |
| 6,430,607 B1 | 7/2002 | Kavner |
| 6,438,592 B1 | 8/2002 | Killian |
| 6,442,165 B1 | 8/2002 | Sitaraman et al. |
| 6,452,925 B1 | 8/2002 | Sistanizadeh et al. |
| 6,457,047 B1 | 9/2002 | Chandra et al. |
| 6,459,909 B1 | 10/2002 | Bilcliff et al. |
| 6,473,804 B1 | 10/2002 | Kaiser et al. |
| 6,484,143 B1 | 10/2002 | Swildens et al. |
| 6,484,161 B1 | 11/2002 | Chipalkatti et al. |
| 6,493,765 B1 | 11/2002 | Cunningham et al. |
| 6,505,241 B2 | 1/2003 | Pitts |
| 6,513,112 B1 | 1/2003 | Craig et al. |
| 6,523,036 B1 | 1/2003 | Hickman et al. |
| 6,529,910 B1 | 2/2003 | Fleskes |
| 6,529,953 B1 | 3/2003 | Van Renesse |
| 6,553,413 B1 | 3/2003 | Leighton et al. |
| 6,560,610 B1 | 4/2003 | Eatherton et al. |
| 6,564,380 B1 | 5/2003 | Murphy |
| 6,611,873 B1 | 5/2003 | Kanehara |
| 6,622,168 B1 | 8/2003 | Datta |
| 6,633,324 B2 | 9/2003 | Stephens, Jr. |
| 6,643,357 B2 | 10/2003 | Lumsden |
| 6,643,707 B1 | 11/2003 | Booth |
| 6,654,807 B2 | 11/2003 | Farber et al. |
| 6,658,462 B1 | 11/2003 | Dutta |
| 6,665,706 B2 | 12/2003 | Kenner et al. |
| 6,678,717 B1 | 1/2004 | Schneider |
| 6,678,791 B1 | 1/2004 | Jacobs et al. |
| 6,681,282 B1 | 1/2004 | Golden et al. |
| 6,687,846 B1 | 1/2004 | Adrangi et al. |
| 6,694,358 B1 | 2/2004 | Swildens et al. |
| 6,697,805 B1 | 2/2004 | Choquier et al. |
| 6,718,324 B2 | 3/2004 | Edlund et al. |
| 6,724,770 B1 | 4/2004 | Van Renesse |
| 6,732,237 B1 | 4/2004 | Jacobs et al. |
| 6,754,699 B2 | 5/2004 | Swildens et al. |
| 6,754,706 B1 | 6/2004 | Swildens et al. |
| 6,760,721 B1 | 6/2004 | Chasen et al. |
| 6,769,031 B1 | 7/2004 | Bero |
| 6,782,398 B1 | 7/2004 | Bahl |
| 6,785,704 B1 | 8/2004 | McCanne |
| 6,795,434 B1 | 8/2004 | Kumar et al. |
| 6,799,214 B1 | 9/2004 | Li |
| 6,804,706 B2 | 9/2004 | Pitts |
| 6,810,291 B2 | 10/2004 | Card et al. |
| 6,810,411 B1 | 10/2004 | Coughlin et al. |
| 6,829,654 B1 | 11/2004 | Jungck |
| 6,862,607 B1 | 3/2005 | Vermeulen |
| 6,868,439 B2 | 3/2005 | Basu et al. |
| 6,874,017 B1 | 3/2005 | Inoue et al. |
| 6,917,951 B2 | 3/2005 | Orbits et al. |
| 6,925,499 B1 | 7/2005 | Chen et al. |
| 6,928,467 B2 | 8/2005 | Peng et al. |
| 6,928,485 B1 | 8/2005 | Krishnamurthy et al. |
| 6,941,562 B2 | 8/2005 | Gao et al. |
| 6,944,167 B1 | 9/2005 | McPherson |
| 6,950,848 B1 | 9/2005 | Yousefi'zadeh et al. |
| 6,961,783 B1 | 9/2005 | Cook et al. |
| 6,963,850 B1 | 11/2005 | Bezos et al. |
| 6,968,389 B1 | 11/2005 | Menditto et al. |
| 6,976,090 B2 | 11/2005 | Ben-Shaul et al. |
| 6,981,017 B1 | 12/2005 | Kasriel et al. |
| 6,981,025 B1 | 12/2005 | Frazier et al. |
| 6,985,945 B2 | 1/2006 | Farhat et al. |
| 6,986,018 B2 | 1/2006 | O'Rourke et al. |
| 6,990,526 B1 | 1/2006 | Zhu |
| 6,996,616 B1 | 1/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,024,466 B2 | 4/2006 | Outten et al. |
| 7,027,582 B2 | 4/2006 | Khello et al. |

(56) References Cited

U.S. PATENT DOCUMENTS

| | | |
|---|---|---|
| 7,031,445 B2 | 4/2006 | Lumsden |
| 7,032,010 B1 | 4/2006 | Swildens et al. |
| 7,058,633 B1 | 4/2006 | Gnagy et al. |
| 7,058,706 B1 | 6/2006 | Iyer et al. |
| 7,058,953 B2 | 6/2006 | Willard et al. |
| 7,062,158 B1 | 6/2006 | Ayaki |
| 7,065,587 B2 | 6/2006 | Huitema et al. |
| 7,072,982 B2 | 6/2006 | Teodosiu et al. |
| 7,076,633 B2 | 7/2006 | Tormasov et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,095,715 B2 | 8/2006 | Buckman et al. |
| 7,096,266 B2 | 8/2006 | Lewin et al. |
| 7,099,936 B2 | 8/2006 | Chase et al. |
| 7,103,645 B2 | 8/2006 | Leighton et al. |
| 7,114,160 B2 | 9/2006 | Suryanarayana et al. |
| 7,117,262 B2 | 9/2006 | Bai et al. |
| 7,133,905 B2 | 10/2006 | Dilley et al. |
| 7,136,922 B2 | 11/2006 | Sundaram et al. |
| 7,139,808 B2 | 11/2006 | Anderson et al. |
| 7,139,821 B1 | 11/2006 | Shah et al. |
| 7,143,169 B1 | 11/2006 | Champagne et al. |
| 7,143,170 B2 | 11/2006 | Swildens et al. |
| 7,146,560 B2 | 11/2006 | Dang et al. |
| 7,149,747 B1 | 12/2006 | Cheng et al. |
| 7,149,809 B2 | 12/2006 | Barde et al. |
| 7,152,118 B2 | 12/2006 | Anderson, IV et al. |
| 7,162,539 B2 | 1/2007 | Garcie-Luna-Aceves |
| 7,165,117 B1 | 1/2007 | Sitaraman et al. |
| 7,171,469 B2 | 1/2007 | Ackaouy et al. |
| 7,174,382 B2 | 1/2007 | Ramanathan et al. |
| 7,185,046 B2 | 2/2007 | Ferstl et al. |
| 7,185,063 B1 | 2/2007 | Kasriel et al. |
| 7,185,084 B2 | 2/2007 | Sirivara et al. |
| 7,188,214 B1 | 2/2007 | Kasriel et al. |
| 7,194,522 B1 | 3/2007 | Swildens et al. |
| 7,194,552 B1 | 3/2007 | Schneider |
| 7,200,667 B2 | 3/2007 | Teodosiu et al. |
| 7,200,673 B1 | 4/2007 | Augart |
| 7,216,170 B2 | 4/2007 | Ludvig et al. |
| 7,225,254 B1 | 5/2007 | Swildens et al. |
| 7,228,350 B2 | 5/2007 | Hong et al. |
| 7,228,359 B1 | 6/2007 | Monteiro |
| 7,233,978 B2 | 6/2007 | Overton et al. |
| 7,240,100 B1 | 6/2007 | Wein et al. |
| 7,249,196 B1 | 7/2007 | Peiffer et al. |
| 7,251,675 B1 | 7/2007 | Kamakura et al. |
| 7,254,626 B1 | 7/2007 | Kommula et al. |
| 7,272,227 B1 | 7/2007 | Beran |
| 7,254,634 B1 | 8/2007 | Davis et al. |
| 7,254,636 B1 | 8/2007 | O'Toole, Jr. et al. |
| 7,257,581 B1 | 8/2007 | Steele et al. |
| 7,260,598 B1 | 8/2007 | Liskov et al. |
| 7,260,639 B2 | 8/2007 | Afergan et al. |
| 7,269,784 B1 | 9/2007 | Kasriel et al. |
| 7,274,658 B2 | 9/2007 | Bornstein et al. |
| 7,284,056 B2 | 9/2007 | Ramig |
| 7,289,519 B1 | 10/2007 | Liskov |
| 7,293,093 B2 | 10/2007 | Leighton |
| 7,302,608 B1 | 11/2007 | Acharya et al. |
| 7,308,499 B2 | 11/2007 | Chavez |
| 7,310,686 B2 | 12/2007 | Uysal |
| 7,316,648 B2 | 1/2008 | Kelly et al. |
| 7,318,074 B2 | 1/2008 | Iyengar et al. |
| 7,320,131 B1 | 1/2008 | O'Toole, Jr. |
| 7,321,918 B2 | 1/2008 | Burd et al. |
| 7,337,968 B2 | 1/2008 | Wilz, Sr. et al. |
| 7,339,937 B2 | 3/2008 | Mitra et al. |
| 7,340,505 B2 | 3/2008 | Lisiecki et al. |
| 7,343,397 B2 | 3/2008 | Kochanski |
| 7,350,075 B1 | 3/2008 | Eastham et al. |
| 7,362,703 B1 | 3/2008 | Taft et al. |
| 7,363,291 B1 | 4/2008 | Page |
| 7,363,626 B2 | 4/2008 | Koutharapu et al. |
| 7,370,089 B2 | 4/2008 | Boyd et al. |
| 7,372,809 B2 | 5/2008 | Chen |
| 7,373,416 B2 | 5/2008 | Kagan et al. |
| 7,376,716 B2 | 5/2008 | Dilley et al. |
| 7,376,736 B2 | 5/2008 | Sundaram et al. |
| 7,380,078 B2 | 5/2008 | Ikegaya et al. |
| 7,389,354 B1 | 5/2008 | Sitaraman et al. |
| 7,392,236 B2 | 6/2008 | Rusch et al. |
| 7,398,301 B2 | 6/2008 | Hennessey et al. |
| 7,406,512 B2 | 7/2008 | Swildens et al. |
| 7,406,522 B2 | 7/2008 | Riddle |
| 7,409,712 B1 | 7/2008 | Brooks et al. |
| 7,430,610 B2 | 8/2008 | Pace et al. |
| 7,441,045 B2 | 9/2008 | Skene et al. |
| 7,441,261 B2 | 10/2008 | Slater et al. |
| 7,451,230 B2 | 10/2008 | Corrado et al. |
| 7,454,457 B1 | 11/2008 | Lowery et al. |
| 7,454,500 B1 | 11/2008 | Hsu et al. |
| 7,461,170 B1 | 11/2008 | Taylor et al. |
| 7,464,142 B2 | 12/2008 | Flurry et al. |
| 7,472,201 B1 | 12/2008 | Aitken |
| 7,478,148 B2 | 1/2009 | Neerdaels |
| 7,492,720 B2 | 1/2009 | Pruthi et al. |
| 7,496,651 B1 | 2/2009 | Joshi |
| 7,499,998 B2 | 2/2009 | Toebes et al. |
| 7,502,836 B1 | 3/2009 | Menditto et al. |
| 7,505,464 B2 | 3/2009 | Okmianski et al. |
| 7,506,034 B2 | 3/2009 | Coates et al. |
| 7,519,705 B1 | 3/2009 | Papagiannaki et al. |
| 7,519,720 B2 | 4/2009 | Fishman et al. |
| 7,519,726 B2 | 4/2009 | Palliyil et al. |
| 7,523,181 B2 | 4/2009 | Swildens et al. |
| 7,543,024 B2 | 4/2009 | Holstege |
| 7,548,947 B2 | 6/2009 | Kasriel et al. |
| 7,552,235 B2 | 6/2009 | Chase et al. |
| 7,555,542 B1 | 6/2009 | Ayers et al. |
| 7,561,571 B1 | 6/2009 | Lovett et al. |
| 7,565,407 B1 | 7/2009 | Hayball |
| 7,568,032 B2 | 7/2009 | Feng et al. |
| 7,573,916 B1 | 7/2009 | Bechtolsheim et al. |
| 7,574,499 B1 | 8/2009 | Swildens et al. |
| 7,581,009 B1 | 8/2009 | Hsu et al. |
| 7,593,935 B2 | 8/2009 | Sullivan |
| 7,584,507 B1 | 9/2009 | Nucci |
| 7,594,189 B1 | 9/2009 | Walker et al. |
| 7,596,619 B2 | 9/2009 | Leighton et al. |
| 7,603,439 B2 | 9/2009 | Dilley et al. |
| 7,613,815 B1 | 10/2009 | Prakash et al. |
| 7,617,222 B2 | 11/2009 | Coulthard et al. |
| 7,623,460 B2 | 11/2009 | Miyazaki |
| 7,624,169 B2 | 11/2009 | Lisiecki et al. |
| 7,624,264 B2 | 11/2009 | Aura et al. |
| 7,631,101 B2 | 11/2009 | Sullivan et al. |
| 7,626,940 B2 | 12/2009 | Jain |
| 7,640,296 B2 | 12/2009 | Fuchs et al. |
| 7,650,376 B1 | 1/2010 | Blumenau |
| 7,653,689 B1 | 1/2010 | Champagne et al. |
| 7,653,700 B1 | 1/2010 | Bahl et al. |
| 7,653,725 B2 | 1/2010 | Yahiro et al. |
| 7,657,613 B1 | 1/2010 | Hanson et al. |
| 7,657,622 B1 | 2/2010 | Douglis et al. |
| 7,661,027 B2 | 2/2010 | Langen et al. |
| 7,664,831 B2 | 2/2010 | Cartmell et al. |
| 7,664,879 B2 | 2/2010 | Chan et al. |
| 7,676,570 B2 | 2/2010 | Levy et al. |
| 7,680,897 B1 | 3/2010 | Carter et al. |
| 7,684,394 B1 | 3/2010 | Cutbill et al. |
| 7,685,109 B1 | 3/2010 | Ransil et al. |
| 7,685,251 B2 | 3/2010 | Houlihan et al. |
| 7,685,270 B1 | 3/2010 | Vermeulen et al. |
| 7,685,273 B1 | 3/2010 | Anastas et al. |
| 7,693,813 B1 | 3/2010 | Cao et al. |
| 7,693,959 B2 | 4/2010 | Leighton et al. |
| 7,698,418 B2 | 4/2010 | Shimada et al. |
| 7,702,724 B1 | 4/2010 | Brydon et al. |
| 7,706,740 B2 | 4/2010 | Collins et al. |
| 7,707,071 B2 | 4/2010 | Rigole |
| 7,707,314 B2 | 4/2010 | McCarthy et al. |

(56) References Cited

U.S. PATENT DOCUMENTS

| | | |
|---|---|---|
| 7,711,647 B2 | 4/2010 | Gunaseelan et al. |
| 7,711,788 B2 | 5/2010 | Lev Ran et al. |
| 7,716,367 B1 | 5/2010 | Leighton et al. |
| 7,725,602 B2 | 5/2010 | Liu et al. |
| 7,725,658 B2 | 5/2010 | Lang et al. |
| 7,730,187 B2 | 5/2010 | Raciborski et al. |
| 7,739,400 B2 | 6/2010 | Lindbo et al. |
| 7,747,720 B2 | 6/2010 | Toebes et al. |
| 7,748,005 B2 | 6/2010 | Romero et al. |
| 7,756,017 B2 | 7/2010 | Goyal et al. |
| 7,756,032 B2 | 7/2010 | Feick et al. |
| 7,756,913 B1 | 7/2010 | Day |
| 7,756,965 B2 | 7/2010 | Joshi |
| 7,757,202 B2 | 7/2010 | Dahlsted et al. |
| 7,761,572 B1 | 7/2010 | Auerbach |
| 7,765,295 B2 | 7/2010 | Anastas et al. |
| 7,765,304 B2 | 7/2010 | Davis et al. |
| 7,769,823 B2 | 7/2010 | Jenny et al. |
| 7,773,596 B1 | 8/2010 | Marques |
| 7,774,342 B1 | 8/2010 | Virdy |
| 7,783,727 B1 | 8/2010 | Foley et al. |
| 7,787,380 B1 | 8/2010 | Aggarwal et al. |
| 7,792,989 B2 | 8/2010 | Toebes et al. |
| 7,805,516 B2 | 9/2010 | Kettler et al. |
| 7,809,597 B2 | 9/2010 | Das et al. |
| 7,813,308 B2 | 10/2010 | Reddy et al. |
| 7,814,229 B1 | 10/2010 | Cabrera et al. |
| 7,818,454 B2 | 10/2010 | Kim et al. |
| 7,827,256 B2 | 10/2010 | Phillips et al. |
| 7,836,177 B2 | 11/2010 | Kasriel et al. |
| 7,853,719 B1 | 11/2010 | Cao et al. |
| 7,853,680 B2 | 12/2010 | Phatak |
| 7,860,735 B2 | 12/2010 | Evanitsky |
| 7,865,594 B1 | 1/2011 | Baumback et al. |
| 7,865,953 B1 | 1/2011 | Hsieh et al. |
| 7,873,065 B1 | 1/2011 | Mukerji et al. |
| 7,890,612 B2 | 1/2011 | Todd et al. |
| 7,890,989 B1 | 2/2011 | Hofrichter et al. |
| 7,899,899 B2 | 2/2011 | Joshi |
| 7,904,875 B2 | 3/2011 | Hegyi |
| 7,912,921 B2 | 3/2011 | O'Rourke et al. |
| 7,925,782 B2 | 3/2011 | Sivasubramanian et al. |
| 7,925,713 B1 | 4/2011 | Day et al. |
| 7,930,393 B1 | 4/2011 | Baumback et al. |
| 7,930,402 B2 | 4/2011 | Swildens et al. |
| 7,930,427 B2 | 4/2011 | Josefsberg et al. |
| 7,933,988 B2 | 4/2011 | Nasuto et al. |
| 7,937,456 B2 | 4/2011 | McGrath |
| 7,937,477 B1 | 5/2011 | Day et al. |
| 7,945,693 B2 | 5/2011 | Farber et al. |
| 7,949,779 B2 | 5/2011 | Farber et al. |
| 7,949,785 B2 | 5/2011 | Alkhatib et al. |
| 7,958,222 B1 | 5/2011 | Pruitt et al. |
| 7,958,258 B2 | 6/2011 | Yeung et al. |
| 7,961,736 B2 | 6/2011 | Ayyagari |
| 7,962,597 B2 | 6/2011 | Richardson et al. |
| 7,966,404 B2 | 6/2011 | Hedin et al. |
| 7,970,816 B2 | 6/2011 | Chess et al. |
| 7,970,940 B1 | 6/2011 | van de Ven et al. |
| 7,979,509 B1 | 6/2011 | Malmskog et al. |
| 7,991,910 B2 | 7/2011 | Richardson et al. |
| 7,996,404 B2 | 8/2011 | Wong et al. |
| 7,996,533 B2 | 8/2011 | Leighton et al. |
| 7,996,535 B2 | 8/2011 | Auerbach |
| 8,000,724 B1 | 8/2011 | Rayburn et al. |
| 8,001,187 B2 | 8/2011 | Stochosky |
| 8,010,705 B1 | 8/2011 | Sebastian et al. |
| 8,010,707 B2 | 8/2011 | Elzur et al. |
| 8,019,869 B2 | 8/2011 | Kriegsman |
| 8,024,441 B2 | 9/2011 | Kommula et al. |
| 8,028,090 B2 | 9/2011 | Richardson et al. |
| 8,041,773 B2 | 9/2011 | Abu-Ghazaleh et al. |
| 8,041,809 B2 | 10/2011 | Sundaram et al. |
| 8,041,818 B2 | 10/2011 | Gupta et al. |
| 8,042,054 B2 | 10/2011 | White et al. |
| 8,051,166 B1 | 10/2011 | Baumback et al. |
| 8,065,275 B2 | 11/2011 | Eriksen et al. |
| 8,069,231 B2 | 11/2011 | Schran et al. |
| 8,073,940 B1 | 11/2011 | Richardson et al. |
| 8,079,087 B1 | 12/2011 | Spies et al. |
| 8,082,348 B1 | 12/2011 | Averbuj et al. |
| 8,099,487 B1 | 1/2012 | Smirnov et al. |
| 8,108,623 B2 | 1/2012 | Krishnaprasad et al. |
| 8,117,306 B1 | 1/2012 | Baumback et al. |
| 8,122,098 B1 | 2/2012 | Richardson et al. |
| 8,122,124 B1 | 2/2012 | Baumback et al. |
| 8,132,242 B1 | 2/2012 | Wu |
| 8,135,820 B2 | 3/2012 | Richardson et al. |
| 8,155,126 B1 | 3/2012 | Mao et al. |
| 8,156,199 B1 | 4/2012 | Hoche-Mong et al. |
| 8,156,243 B2 | 4/2012 | Richardson et al. |
| 8,161,184 B2 | 4/2012 | Sekar et al. |
| 8,165,915 B1 | 4/2012 | Lucash |
| 8,175,863 B1 | 4/2012 | Ostermeyer et al. |
| 8,180,720 B1 | 5/2012 | Kovacs et al. |
| 8,190,682 B2 | 5/2012 | Paterson-Jones et al. |
| 8,195,605 B2 | 5/2012 | Chellappa et al. |
| 8,195,837 B2 | 6/2012 | McCarthy et al. |
| 8,209,695 B1 | 6/2012 | Pruyne et al. |
| 8,224,971 B1 | 6/2012 | Miller et al. |
| 8,218,965 B1 | 7/2012 | Uhlhorn et al. |
| 8,219,647 B2 | 7/2012 | Harvell et al. |
| 8,224,942 B1 | 7/2012 | Presotto et al. |
| 8,224,986 B1 | 7/2012 | Liskov et al. |
| 8,224,994 B1 | 7/2012 | Schneider |
| 8,234,403 B2 | 7/2012 | Richardson et al. |
| 8,239,530 B2 | 7/2012 | Sundaram et al. |
| 8,250,135 B2 | 8/2012 | Driesen et al. |
| 8,250,211 B2 | 8/2012 | Swildens et al. |
| 8,250,219 B2 | 8/2012 | Raciborski et al. |
| 8,260,914 B1 | 8/2012 | Ranjan |
| 8,261,062 B2 | 9/2012 | Aura et al. |
| 8,266,288 B2 | 9/2012 | Banerjee et al. |
| 8,266,327 B2 | 9/2012 | Kumar et al. |
| 8,271,471 B1 | 9/2012 | Kamvar et al. |
| 8,280,998 B2 | 9/2012 | Joshi |
| 8,281,035 B2 | 10/2012 | Farber et al. |
| 8,286,176 B1 | 10/2012 | Baumback et al. |
| 8,291,046 B2 | 10/2012 | Farber et al. |
| 8,291,117 B1 | 10/2012 | Eggleston et al. |
| 8,296,375 B1 | 10/2012 | Katzer et al. |
| 8,296,393 B2 | 10/2012 | Alexander et al. |
| 8,296,429 B2 | 10/2012 | Baumback et al. |
| 8,296,786 B2 | 10/2012 | Faust et al. |
| 8,301,600 B1 | 10/2012 | Helmick et al. |
| 8,301,645 B1 | 10/2012 | Crook |
| 8,316,124 B1 | 10/2012 | Baumback et al. |
| 8,321,568 B2 | 11/2012 | Sivasubramanian et al. |
| 8,321,588 B2 | 11/2012 | Richardson et al. |
| 8,331,370 B2 | 11/2012 | Hamilton et al. |
| 8,341,745 B1 | 12/2012 | Chat et al. |
| 8,356,074 B1 | 1/2013 | Ehrlich et al. |
| 8,380,831 B2 | 1/2013 | Barber |
| 8,380,851 B2 | 2/2013 | McCarthy et al. |
| 8,392,928 B1 | 2/2013 | Forys et al. |
| 8,396,908 B2 | 3/2013 | Moore et al. |
| 8,402,137 B2 | 3/2013 | Sivasuramanian et al. |
| 8,423,408 B1 | 3/2013 | Barnes et al. |
| 8,423,662 B1 | 4/2013 | Weihl et al. |
| 8,423,667 B2 | 4/2013 | Richardson et al. |
| 8,433,749 B2 | 4/2013 | Wee et al. |
| 8,443,167 B1 | 4/2013 | Fallone et al. |
| 8,447,831 B1 | 5/2013 | Sivasubramanian et al. |
| 8,447,854 B1 | 5/2013 | Jasinskyj |
| 8,447,876 B2 | 5/2013 | Verma et al. |
| 8,452,745 B2 | 5/2013 | Ramakrishna |
| 8,452,870 B2 | 5/2013 | Baumback et al. |
| 8,452,874 B2 | 5/2013 | MacCarthaigh et al. |
| 8,463,877 B1 | 5/2013 | Richardson |
| 8,458,360 B2 | 6/2013 | Richardson et al. |
| 8,468,222 B2 | 6/2013 | Sakata et al. |
| 8,468,245 B2 | 6/2013 | Farber et al. |
| 8,473,613 B2 | 6/2013 | Farber et al. |
| 8,478,903 B2 | 6/2013 | Farber et al. |

(56) References Cited

U.S. PATENT DOCUMENTS

| | | |
|---|---|---|
| 8,478,883 B2 | 7/2013 | Day et al. |
| 8,489,737 B2 | 7/2013 | Baumback et al. |
| 8,504,721 B2 | 7/2013 | Hsu et al. |
| 8,504,775 B2 | 8/2013 | Plamondon |
| 8,510,428 B2 | 8/2013 | Joshi |
| 8,510,807 B1 | 8/2013 | Elazary et al. |
| 8,516,082 B2 | 8/2013 | Cadwell et al. |
| 8,521,851 B1 | 8/2013 | Richardson et al. |
| 8,521,876 B2 | 8/2013 | Goodman et al. |
| 8,521,880 B1 | 8/2013 | Richardson et al. |
| 8,521,885 B1 | 8/2013 | Richardson et al. |
| 8,521,908 B2 | 8/2013 | Holmes et al. |
| 8,526,405 B2 | 8/2013 | Curtis et al. |
| 8,527,639 B1 | 9/2013 | Liskov et al. |
| 8,527,645 B1 | 9/2013 | Proffit et al. |
| 8,527,658 B2 | 9/2013 | Holmes et al. |
| 8,549,646 B2 | 9/2013 | Stavrou et al. |
| 8,572,208 B2 | 10/2013 | Farber et al. |
| 8,572,210 B2 | 10/2013 | Farber et al. |
| 8,577,992 B1 | 10/2013 | Richardson et al. |
| 8,577,963 B2 | 11/2013 | Trahan et al. |
| 8,589,996 B2 | 11/2013 | Ma et al. |
| 8,606,996 B2 | 11/2013 | Richardson et al. |
| 8,606,926 B2 | 12/2013 | Ulevitch |
| 8,612,565 B2 | 12/2013 | Schneider |
| 8,612,588 B1 | 12/2013 | Ehrlich et al. |
| 8,615,549 B2 | 12/2013 | Knowles et al. |
| 8,619,780 B1 | 12/2013 | Brandwine |
| 8,626,950 B1 | 1/2014 | Richardson et al. |
| 8,635,340 B1 | 1/2014 | Schneider |
| 8,639,817 B2 | 1/2014 | Sivasubramanian et al. |
| 8,645,539 B2 | 1/2014 | McCarthy et al. |
| 8,645,700 B2 | 2/2014 | Smith et al. |
| 8,667,127 B2 | 2/2014 | Bettis et al. |
| 8,676,918 B2 | 3/2014 | Richardson et al. |
| 8,683,023 B1 | 3/2014 | Brandwine et al. |
| 8,683,076 B2 | 3/2014 | Farber et al. |
| 8,688,837 B1 | 3/2014 | Richardson et al. |
| 8,694,642 B2 | 4/2014 | Dempsky et al. |
| 8,712,950 B2 | 4/2014 | Smith et al. |
| 8,732,309 B1 | 4/2014 | Richardson et al. |
| 8,738,766 B1 | 5/2014 | Kazerani et al. |
| 8,745,177 B1 | 5/2014 | Kazerani et al. |
| 8,756,322 B1 | 6/2014 | Lynch |
| 8,756,325 B2 | 6/2014 | Sivasubramanian et al. |
| 8,756,341 B1 | 6/2014 | Richardson et al. |
| 8,762,526 B2 | 6/2014 | Baumback et al. |
| 8,775,553 B2 | 6/2014 | Cansino et al. |
| 8,782,207 B2 | 7/2014 | Qiu et al. |
| 8,782,236 B1 | 7/2014 | Marshall et al. |
| 8,782,279 B2 | 7/2014 | Eggleston et al. |
| 8,788,671 B2 | 7/2014 | Richardson et al. |
| 8,812,727 B1 | 7/2014 | Sorenson, III et al. |
| 8,819,187 B1 | 8/2014 | Hofmann |
| 8,819,283 B2 | 8/2014 | Richardson et al. |
| 8,826,032 B1 | 8/2014 | Yahalom et al. |
| 8,843,625 B2 | 9/2014 | Baumback et al. |
| 8,902,897 B2 | 9/2014 | Hamilton et al. |
| 8,885,584 B2 | 11/2014 | Praveenkumar et al. |
| 8,904,009 B1 | 12/2014 | Marshall et al. |
| 8,914,514 B1 | 12/2014 | Jenkins et al. |
| 8,914,626 B1 | 12/2014 | Adogla et al. |
| 8,914,797 B2 | 12/2014 | Osogami et al. |
| 8,914,814 B1 | 12/2014 | Middleton et al. |
| 8,924,466 B2 | 12/2014 | Seed et al. |
| 8,924,528 B1 | 12/2014 | Richardson et al. |
| 8,930,513 B1 | 1/2015 | Richardson et al. |
| 8,930,544 B2 | 1/2015 | Richardson et al. |
| 8,935,744 B2 | 1/2015 | Osterweil et al. |
| 8,938,526 B1 | 1/2015 | Richardson et al. |
| 8,949,161 B2 | 1/2015 | Borst et al. |
| 8,949,459 B1 | 2/2015 | Scholl |
| 8,966,318 B1 | 2/2015 | Shah |
| 8,971,328 B2 | 2/2015 | Judge et al. |
| 8,972,580 B2 | 3/2015 | Fleischman et al. |
| 8,976,711 B2 | 3/2015 | Li et al. |
| 9,003,035 B1 | 3/2015 | Richardson et al. |
| 9,003,040 B2 | 4/2015 | MacCarthaigh et al. |
| 9,009,286 B2 | 4/2015 | Sivasubramanian et al. |
| 9,009,334 B1 | 4/2015 | Jenkins et al. |
| 9,021,127 B2 | 4/2015 | Richardson et al. |
| 9,021,128 B2 | 4/2015 | Sivasubramanian et al. |
| 9,021,129 B2 | 4/2015 | Richardson et al. |
| 9,026,616 B2 | 4/2015 | Sivasubramanian et al. |
| 9,037,975 B1 | 5/2015 | Taylor et al. |
| 9,071,502 B2 | 5/2015 | Baumback et al. |
| 9,075,777 B1 | 6/2015 | Pope et al. |
| 9,075,893 B1 | 7/2015 | Jenkins |
| 9,083,675 B2 | 7/2015 | Richardson et al. |
| 9,083,743 B1 | 7/2015 | Patel et al. |
| 9,088,460 B2 | 7/2015 | Baumback et al. |
| 9,092,141 B2 | 7/2015 | Hayashi |
| 9,106,701 B2 | 7/2015 | Richardson et al. |
| 9,116,803 B1 | 8/2015 | Agrawal et al. |
| 9,118,543 B2 | 8/2015 | Baumback et al. |
| 9,118,680 B1 | 8/2015 | Dunlap et al. |
| 9,130,756 B2 | 8/2015 | Richardson et al. |
| 9,130,977 B2 | 9/2015 | Zisapel et al. |
| 9,137,210 B1 | 9/2015 | Joglekar et al. |
| 9,137,301 B1 | 9/2015 | Dunlap et al. |
| 9,137,302 B1 | 9/2015 | Makhijani et al. |
| 9,154,551 B1 | 9/2015 | Watson |
| 9,160,641 B2 | 10/2015 | Baumback et al. |
| 9,160,703 B2 | 10/2015 | Richardson et al. |
| 9,172,674 B1 | 10/2015 | Patel et al. |
| 9,176,894 B2 | 10/2015 | Marshall et al. |
| 9,185,012 B2 | 11/2015 | Richardson et al. |
| 9,191,338 B2 | 11/2015 | Richardson et al. |
| 9,191,393 B2 | 11/2015 | Tovar |
| 9,191,458 B2 | 11/2015 | Richardson et al. |
| 9,195,996 B1 | 11/2015 | Walsh et al. |
| 9,208,097 B2 | 11/2015 | Richardson et al. |
| 9,210,099 B2 | 12/2015 | Baumback et al. |
| 9,210,235 B2 | 12/2015 | Sivasubramanian et al. |
| 9,219,686 B2 | 12/2015 | Hilt et al. |
| 9,237,087 B1 | 1/2016 | Risbood et al. |
| 9,237,114 B2 | 1/2016 | Richardson et al. |
| 9,240,954 B1 | 1/2016 | Ellsworth et al. |
| 9,246,776 B2 | 1/2016 | Ellsworth et al. |
| 9,253,065 B2 | 1/2016 | Richardson et al. |
| 9,251,112 B2 | 2/2016 | Richardson et al. |
| 9,276,812 B1 | 2/2016 | Nagargadde et al. |
| 9,282,032 B2 | 3/2016 | Judge et al. |
| 9,294,391 B1 | 3/2016 | Mostert |
| 9,300,535 B2 | 3/2016 | Popli et al. |
| 9,323,577 B2 | 3/2016 | Marr et al. |
| 9,332,078 B2 | 4/2016 | Sivasubramanian et al. |
| 9,367,929 B2 | 5/2016 | Bettis et al. |
| 9,386,038 B2 | 6/2016 | Martini |
| 9,391,949 B1 | 7/2016 | Richardson et al. |
| 9,407,676 B2 | 7/2016 | Archer et al. |
| 9,407,539 B1 | 8/2016 | Dickinson et al. |
| 9,407,681 B1 | 8/2016 | Richardson et al. |
| 9,407,699 B2 | 8/2016 | Sivasubramanian et al. |
| 9,444,718 B2 | 8/2016 | Khakpour et al. |
| 9,444,759 B2 | 9/2016 | Richardson et al. |
| 9,479,476 B2 | 9/2016 | Richardson et al. |
| 9,491,073 B2 | 10/2016 | Baumback et al. |
| 9,495,338 B1 | 11/2016 | Hollis et al. |
| 9,497,259 B1 | 11/2016 | Richardson et al. |
| 9,515,949 B2 | 11/2016 | Richardson et al. |
| 9,525,659 B1 | 12/2016 | Sonkin et al. |
| 9,544,388 B1 | 1/2017 | Li et al. |
| 9,544,394 B2 | 1/2017 | Richardson et al. |
| 9,571,389 B2 | 1/2017 | Richardson et al. |
| 9,575,808 B1 | 2/2017 | Yamala et al. |
| 9,584,328 B2 | 2/2017 | Graham-cumming |
| 9,590,946 B2 | 2/2017 | Richardson et al. |
| 9,608,957 B2 | 3/2017 | Sivasubramanian et al. |
| 9,621,660 B2 | 3/2017 | Sivasubramanian et al. |
| 9,628,403 B2 | 4/2017 | Baumback et al. |
| 9,628,509 B2 | 4/2017 | Holloway et al. |
| 9,628,554 B2 | 4/2017 | Marshall et al. |
| 9,645,808 B1 | 4/2017 | Turpie |

(56) References Cited

U.S. PATENT DOCUMENTS

| | | |
|---|---|---|
| 9,660,890 B2 | 5/2017 | Baumback et al. |
| 9,703,713 B2 | 5/2017 | Nadgowda |
| 9,699,108 B2 | 7/2017 | Popli et al. |
| 9,705,922 B2 | 7/2017 | Foxhoven et al. |
| 9,712,325 B2 | 7/2017 | Richardson et al. |
| 9,712,484 B1 | 7/2017 | Richardson et al. |
| 9,734,472 B2 | 7/2017 | Richardson et al. |
| 9,742,795 B1 | 8/2017 | Radlein et al. |
| 9,760,420 B1 | 8/2017 | Letz et al. |
| 9,769,248 B1 | 9/2017 | Krishnan et al. |
| 9,774,619 B1 | 9/2017 | Radlein et al. |
| 9,787,599 B2 | 9/2017 | Richardson et al. |
| 9,787,775 B1 | 10/2017 | Richardson et al. |
| 9,794,188 B2 | 10/2017 | Baumback et al. |
| 9,794,216 B2 | 10/2017 | Richardson et al. |
| 9,794,281 B1 | 10/2017 | Radlein et al. |
| 9,800,539 B2 | 10/2017 | Richardson et al. |
| 9,811,451 B1 | 10/2017 | Arguelles et al. |
| 9,819,567 B1 | 11/2017 | Uppal et al. |
| 9,825,831 B2 | 11/2017 | Baumback et al. |
| 9,832,141 B1 | 11/2017 | Raftery |
| 9,871,794 B2 | 1/2018 | Joffe et al. |
| 9,887,914 B2 | 1/2018 | Bergman |
| 9,887,915 B2 | 2/2018 | Richardson et al. |
| 9,887,931 B1 | 2/2018 | Uppal et al. |
| 9,887,932 B1 | 2/2018 | Uppal et al. |
| 9,888,089 B2 | 2/2018 | Sivasubramanian et al. |
| 9,893,957 B2 | 2/2018 | Ellsworth et al. |
| 9,894,168 B2 | 2/2018 | Sivasubramanian et al. |
| 9,900,402 B1 | 2/2018 | Li et al. |
| 9,912,740 B2 | 2/2018 | Richardson et al. |
| 9,929,959 B2 | 3/2018 | Mostert |
| 9,930,131 B2 | 3/2018 | MacCarthaigh et al. |
| 9,954,934 B2 | 3/2018 | Sivasubramanian et al. |
| 9,985,927 B2 | 4/2018 | Richardson et al. |
| 9,992,086 B1 | 5/2018 | Mizik et al. |
| 9,992,303 B2 | 6/2018 | Richardson et al. |
| 9,996,501 B1 | 6/2018 | Nelson et al. |
| 9,996,572 B2 | 6/2018 | Calder et al. |
| 10,015,237 B2 | 6/2018 | Richardson et al. |
| 10,015,241 B2 | 7/2018 | Marr et al. |
| 10,027,582 B2 | 7/2018 | Richardson et al. |
| 10,027,739 B1 | 7/2018 | Krishnan et al. |
| 10,033,627 B1 | 7/2018 | Howard et al. |
| 10,033,691 B1 | 7/2018 | Mizik et al. |
| 10,033,699 B2 | 7/2018 | Sullivan et al. |
| 10,049,051 B1 | 7/2018 | Baldwin |
| 10,162,753 B2 | 7/2018 | Marshall et al. |
| 10,048,974 B1 | 8/2018 | Wagner et al. |
| 10,063,459 B2 | 8/2018 | Judge et al. |
| 10,075,551 B1 | 8/2018 | Baldwin et al. |
| 10,079,742 B1 | 9/2018 | Richardson et al. |
| 10,091,096 B1 | 9/2018 | Howard et al. |
| 10,097,398 B1 | 10/2018 | Richardson et al. |
| 10,097,448 B1 | 10/2018 | Howard et al. |
| 10,097,566 B1 | 10/2018 | Radlein et al. |
| 10,104,009 B2 | 10/2018 | Baumback et al. |
| 10,110,694 B1 | 10/2018 | Watson et al. |
| 10,116,584 B2 | 10/2018 | Richardson et al. |
| 10,135,620 B2 | 10/2018 | Richardson et al. |
| 10,148,542 B2 | 11/2018 | Baumback et al. |
| 10,021,179 B1 | 12/2018 | Velummylum et al. |
| 10,157,135 B2 | 12/2018 | Richardson et al. |
| 10,158,729 B2 | 12/2018 | Sivasubramanian et al. |
| 10,180,993 B2 | 1/2019 | Raftery |
| 10,200,402 B2 | 1/2019 | Radlein et al. |
| 10,200,492 B2 | 2/2019 | MacCarthaigh et al. |
| 10,204,041 B2 | 2/2019 | Allen et al. |
| 10,205,644 B2 | 2/2019 | Baumback et al. |
| 10,205,698 B1 | 2/2019 | Petersen et al. |
| 10,218,584 B2 | 2/2019 | Ellsworth et al. |
| 10,225,322 B2 | 2/2019 | Richardson et al. |
| 10,225,326 B1 | 3/2019 | Puchala et al. |
| 10,225,362 B2 | 3/2019 | Watson |
| 10,225,365 B1 | 3/2019 | Hotchkies et al. |
| 10,230,819 B2 | 3/2019 | Richardson et al. |
| 10,257,307 B1 | 3/2019 | Baldwin |
| 10,264,062 B2 | 4/2019 | Richardson et al. |
| 10,270,878 B1 | 4/2019 | Uppal et al. |
| 10,284,446 B2 | 4/2019 | Baumback et al. |
| 10,305,797 B2 | 5/2019 | Richardson et al. |
| 10,311,371 B1 | 5/2019 | Hotchkies et al. |
| 10,348,639 B2 | 7/2019 | Puchala et al. |
| 10,372,499 B1 | 8/2019 | Radhakrishnan et al. |
| 10,374,955 B2 | 8/2019 | Mostert |
| 10,410,085 B2 | 9/2019 | Bettis et al. |
| 10,430,084 B2 | 10/2019 | Goss et al. |
| 10,447,648 B2 | 10/2019 | Bliss et al. |
| 10,462,025 B2 | 10/2019 | Baumback et al. |
| 10,467,042 B1 | 11/2019 | Mercier et al. |
| 10,469,355 B2 | 11/2019 | Uppal et al. |
| 10,469,513 B2 | 11/2019 | Uppal et al. |
| 10,491,534 B2 | 11/2019 | Richardson et al. |
| 10,505,961 B2 | 12/2019 | Uppal et al. |
| 10,506,029 B2 | 12/2019 | Hollis et al. |
| 10,511,567 B2 | 12/2019 | Richardson et al. |
| 10,516,590 B2 | 12/2019 | Mizik et al. |
| 10,521,348 B2 | 12/2019 | Marshall et al. |
| 10,523,783 B2 | 12/2019 | Richardson et al. |
| 10,530,874 B2 | 1/2020 | Sivasubramanian et al. |
| 10,542,079 B2 | 1/2020 | Marr et al. |
| 10,554,748 B2 | 2/2020 | Sivasubramanian et al. |
| 10,574,787 B2 | 2/2020 | Richardson et al. |
| 10,601,767 B2 | 3/2020 | Richardson et al. |
| 10,616,250 B2 | 4/2020 | Uppal et al. |
| 10,623,408 B1 | 4/2020 | Marshall et al. |
| 10,630,771 B1 * | 4/2020 | Garza ................... H04L 67/63 |
| 10,645,149 B2 | 5/2020 | Sivasubramanian et al. |
| 10,666,756 B2 | 5/2020 | Baldwin et al. |
| 10,691,752 B2 | 6/2020 | Raftery |
| 10,742,550 B2 | 8/2020 | Richardson et al. |
| 10,742,593 B1 | 8/2020 | Vasquez et al. |
| 10,771,552 B2 | 9/2020 | Sivasubramanian et al. |
| 10,778,554 B2 | 9/2020 | Richardson et al. |
| 10,783,077 B2 | 9/2020 | Marshall et al. |
| 10,785,037 B2 | 9/2020 | Richardson et al. |
| 10,797,995 B2 | 10/2020 | Richardson et al. |
| 10,812,358 B2 | 10/2020 | Navaneetha et al. |
| 10,812,846 B1 | 10/2020 | Vantalon et al. |
| 10,831,549 B1 | 11/2020 | Radhakrishnan et al. |
| 10,931,738 B2 | 2/2021 | Radhakrishnan et al. |
| 10,938,884 B1 | 3/2021 | Baldwin et al. |
| 10,958,501 B1 | 3/2021 | Richardson et al. |
| 11,108,729 B2 | 3/2021 | Richardson et al. |
| 11,025,747 B1 | 6/2021 | Keogh |
| 11,115,500 B2 | 9/2021 | Richardson et al. |
| 11,134,134 B2 | 9/2021 | Uppal et al. |
| 11,194,719 B2 | 12/2021 | Richardson et al. |
| 11,205,037 B2 | 12/2021 | Hollis et al. |
| 11,245,770 B2 | 2/2022 | Sivasubramanian et al. |
| 11,283,715 B2 | 3/2022 | Richardson et al. |
| 11,290,418 B2 | 3/2022 | Vasquez et al. |
| 11,297,140 B2 | 4/2022 | Puchala et al. |
| 11,303,717 B2 | 4/2022 | Watson |
| 11,330,008 B2 | 5/2022 | Uppal et al. |
| 11,336,712 B2 | 5/2022 | Richardson et al. |
| 11,362,986 B2 | 6/2022 | Thunga et al. |
| 11,381,487 B2 | 7/2022 | Howard et al. |
| 11,451,472 B2 | 9/2022 | Richardson et al. |
| 11,457,088 B2 | 9/2022 | Watson et al. |
| 2001/0000811 A1 | 5/2001 | May et al. |
| 2001/0025305 A1 | 9/2001 | Yoshiasa et al. |
| 2001/0027479 A1 | 10/2001 | Delaney et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0004816 A1 | 1/2002 | Vange et al. |
| 2002/0004846 A1 | 1/2002 | Garcia-Luna-Aceves et al. |
| 2002/0007404 A1 | 1/2002 | Vange et al. |
| 2002/0007413 A1 | 1/2002 | Garcia-Luna-Aceves et al. |

(56) References Cited

U.S. PATENT DOCUMENTS

| | | |
|---|---|---|
| 2002/0009079 A1 | 1/2002 | Jungck et al. |
| 2002/0010783 A1 | 1/2002 | Primak et al. |
| 2002/0010798 A1 | 1/2002 | Ben-Shaul et al. |
| 2002/0013823 A1 | 1/2002 | Eubanks |
| 2002/0016831 A1 | 2/2002 | Peled et al. |
| 2002/0035624 A1 | 3/2002 | Kim |
| 2002/0048269 A1 | 4/2002 | Hong et al. |
| 2002/0049608 A1 | 4/2002 | Hartsell et al. |
| 2002/0049842 A1 | 4/2002 | Huetsch et al. |
| 2002/0049857 A1 | 4/2002 | Farber et al. |
| 2002/0052942 A1 | 5/2002 | Swildens et al. |
| 2002/0062372 A1 | 5/2002 | Hong et al. |
| 2002/0065910 A1 | 5/2002 | Dutta |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0083175 A1 | 6/2002 | Afek et al. |
| 2002/0083178 A1 | 6/2002 | Brothers |
| 2002/0083198 A1 | 6/2002 | Kim et al. |
| 2002/0087374 A1 | 7/2002 | Boubez et al. |
| 2002/0087726 A1 | 7/2002 | Macpherson et al. |
| 2002/0087797 A1 | 7/2002 | Adrangi |
| 2002/0091786 A1 | 7/2002 | Yamaguchi et al. |
| 2002/0091801 A1 | 7/2002 | Lewin et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0103820 A1 | 8/2002 | Cartmell et al. |
| 2002/0103972 A1 | 8/2002 | Satran et al. |
| 2002/0107944 A1 | 8/2002 | Bai et al. |
| 2002/0112049 A1 | 8/2002 | Elnozahy et al. |
| 2002/0112123 A1 | 8/2002 | Becker et al. |
| 2002/0116481 A1 | 8/2002 | Lee |
| 2002/0116491 A1 | 8/2002 | Boyd et al. |
| 2002/0116582 A1 | 8/2002 | Copeland et al. |
| 2002/0120666 A1 | 8/2002 | Landsman et al. |
| 2002/0120782 A1 | 8/2002 | Dillon et al. |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0131428 A1 | 9/2002 | Pecus et al. |
| 2002/0133601 A1 | 9/2002 | Kennamer et al. |
| 2002/0133741 A1 | 9/2002 | Maeda et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0138443 A1 | 9/2002 | Schran et al. |
| 2002/0138649 A1 | 9/2002 | Cartmell et al. |
| 2002/0138761 A1 | 9/2002 | Kanemaki et al. |
| 2002/0143675 A1 | 10/2002 | Orshan |
| 2002/0143798 A1 | 10/2002 | Lisiecki et al. |
| 2002/0143989 A1 | 10/2002 | Huitema et al. |
| 2002/0145993 A1 | 10/2002 | Chowdhury et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0150276 A1 | 10/2002 | Chang |
| 2002/0152326 A1 | 10/2002 | Orshan |
| 2002/0154157 A1 | 10/2002 | Sherr et al. |
| 2002/0156884 A1 | 10/2002 | Bertram et al. |
| 2002/0156911 A1 | 10/2002 | Croman et al. |
| 2002/0161745 A1 | 10/2002 | Call |
| 2002/0161767 A1 | 10/2002 | Shapiro et al. |
| 2002/0163882 A1 | 11/2002 | Bornstein et al. |
| 2002/0165912 A1 | 11/2002 | Wenocur et al. |
| 2002/0169890 A1 | 11/2002 | Beaumont et al. |
| 2002/0184368 A1 | 12/2002 | Wang |
| 2002/0187935 A1 | 12/2002 | Redmond et al. |
| 2002/0188722 A1 | 12/2002 | Banerjee et al. |
| 2002/0194324 A1 | 12/2002 | Guha |
| 2002/0194382 A1 | 12/2002 | Kausik et al. |
| 2002/0198953 A1 | 12/2002 | O'Rourke et al. |
| 2003/0002484 A1 | 1/2003 | Freedman |
| 2003/0004998 A1 | 1/2003 | Datta |
| 2003/0005036 A1 | 1/2003 | Mitzenmacher |
| 2003/0005111 A1 | 1/2003 | Allan |
| 2003/0007482 A1 | 1/2003 | Khello et al. |
| 2003/0009488 A1 | 1/2003 | Hart, III |
| 2003/0009562 A1 | 1/2003 | Heymann et al. |
| 2003/0009591 A1 | 1/2003 | Hayball et al. |
| 2003/0026410 A1 | 2/2003 | Lumsden |
| 2003/0028642 A1 | 2/2003 | Agarwal et al. |
| 2003/0033283 A1 | 2/2003 | Evans et al. |
| 2003/0037108 A1 | 2/2003 | Peiffer et al. |
| 2003/0037139 A1 | 2/2003 | Shteyn |
| 2003/0037284 A1 | 2/2003 | Srinivasan et al. |
| 2003/0041094 A1 | 2/2003 | Lara et al. |
| 2003/0046343 A1 | 3/2003 | Krishnamurthy et al. |
| 2003/0065739 A1 | 4/2003 | Shnier |
| 2003/0070096 A1 | 4/2003 | Pazi et al. |
| 2003/0074401 A1 | 4/2003 | Connell et al. |
| 2003/0074471 A1 | 4/2003 | Anderson et al. |
| 2003/0074472 A1 | 4/2003 | Lucco et al. |
| 2003/0079027 A1 | 4/2003 | Slocombe et al. |
| 2003/0093523 A1 | 5/2003 | Cranor et al. |
| 2003/0093691 A1* | 5/2003 | Simon .................. H04L 63/164 726/4 |
| 2003/0097564 A1 | 5/2003 | Tewari et al. |
| 2003/0099202 A1 | 5/2003 | Lear et al. |
| 2003/0099237 A1 | 5/2003 | Mitra et al. |
| 2003/0101278 A1 | 5/2003 | Garcia-Luna-Aceves et al. |
| 2003/0105829 A1 | 6/2003 | Hayward |
| 2003/0105857 A1 | 6/2003 | Kamen et al. |
| 2003/0112792 A1 | 6/2003 | Cranor et al. |
| 2003/0120741 A1 | 6/2003 | Wu et al. |
| 2003/0126387 A1 | 7/2003 | Watanabe |
| 2003/0133554 A1 | 7/2003 | Nykanen et al. |
| 2003/0135467 A1 | 7/2003 | Okamoto |
| 2003/0135468 A1* | 7/2003 | Barbir .................. G06Q 20/382 705/64 |
| 2003/0135509 A1 | 7/2003 | Davis et al. |
| 2003/0140087 A1 | 7/2003 | Lincoln et al. |
| 2003/0145038 A1 | 7/2003 | Bin Tariq et al. |
| 2003/0145066 A1 | 7/2003 | Okada et al. |
| 2003/0149581 A1 | 8/2003 | Chaudhri et al. |
| 2003/0154239 A1 | 8/2003 | Davis et al. |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0177321 A1 | 9/2003 | Watanabe |
| 2003/0182305 A1 | 9/2003 | Balva et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0204742 A1 | 10/2003 | Gupta et al. |
| 2003/0206520 A1 | 11/2003 | Wu et al. |
| 2003/0221000 A1 | 11/2003 | Cherkasova et al. |
| 2003/0225893 A1 | 12/2003 | Roese et al. |
| 2003/0229682 A1 | 12/2003 | Day |
| 2003/0233423 A1 | 12/2003 | Dilley et al. |
| 2003/0233445 A1 | 12/2003 | Levy et al. |
| 2003/0233455 A1 | 12/2003 | Leber et al. |
| 2003/0236700 A1 | 12/2003 | Arning et al. |
| 2003/0236779 A1 | 12/2003 | Choi et al. |
| 2004/0003032 A1 | 1/2004 | Ma et al. |
| 2004/0010562 A1 | 1/2004 | Itonaga |
| 2004/0010563 A1 | 1/2004 | Forte et al. |
| 2004/0010588 A1 | 1/2004 | Slater et al. |
| 2004/0010601 A1* | 1/2004 | Afergan .............. H04L 67/1001 709/229 |
| 2004/0010621 A1 | 1/2004 | Afergan et al. |
| 2004/0010683 A1 | 1/2004 | Huitema |
| 2004/0015584 A1 | 1/2004 | Cartmell et al. |

(56) References Cited

U.S. PATENT DOCUMENTS

| | | |
|---|---|---|
| 2004/0019518 A1 | 1/2004 | Abraham et al. |
| 2004/0019781 A1 | 1/2004 | Chari et al. |
| 2004/0024841 A1 | 1/2004 | Becker et al. |
| 2004/0030620 A1 | 2/2004 | Benjamin et al. |
| 2004/0032278 A1 | 2/2004 | Orii et al. |
| 2004/0034744 A1 | 2/2004 | Karlsson et al. |
| 2004/0039798 A1 | 2/2004 | Hotz et al. |
| 2004/0044731 A1 | 2/2004 | Chen et al. |
| 2004/0044791 A1 | 3/2004 | Pouzzner |
| 2004/0054757 A1 | 3/2004 | Ueda et al. |
| 2004/0059805 A1 | 3/2004 | Dinker et al. |
| 2004/0064335 A1 | 4/2004 | Yang |
| 2004/0064501 A1 | 4/2004 | Jan et al. |
| 2004/0068542 A1 | 4/2004 | Lalonde et al. |
| 2004/0073596 A1 | 4/2004 | Kloninger et al. |
| 2004/0073707 A1 | 4/2004 | Dillon |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083283 A1 | 4/2004 | Sundaram et al. |
| 2004/0083307 A1 | 4/2004 | Uysal |
| 2004/0105544 A1 | 4/2004 | Haneda et al. |
| 2004/0098478 A1 | 5/2004 | Koetke et al. |
| 2004/0114579 A1 | 6/2004 | Karaoguz et al. |
| 2004/0117309 A1 | 6/2004 | Inoue et al. |
| 2004/0117455 A1 | 6/2004 | Kaminksy et al. |
| 2004/0128344 A1 | 6/2004 | Trossen |
| 2004/0128346 A1 | 7/2004 | Melamed et al. |
| 2004/0148520 A1 | 7/2004 | Talpade et al. |
| 2004/0167981 A1 | 7/2004 | Douglas et al. |
| 2004/0167982 A1 | 8/2004 | Cohen et al. |
| 2004/0170379 A1 | 8/2004 | Yao et al. |
| 2004/0172466 A1 | 9/2004 | Douglas et al. |
| 2004/0184456 A1 | 9/2004 | Binding et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0205374 A1 | 10/2004 | Poletto et al. |
| 2004/0215823 A1 | 10/2004 | Kleinfelter et al. |
| 2004/0221019 A1 | 10/2004 | Swildens et al. |
| 2004/0221034 A1 | 11/2004 | Kausik et al. |
| 2004/0246948 A1 | 11/2004 | Lee et al. |
| 2004/0249939 A1 | 12/2004 | Amini et al. |
| 2004/0249971 A1 | 12/2004 | Klinker |
| 2004/0249975 A1 | 12/2004 | Tuck et al. |
| 2004/0250119 A1 | 12/2004 | Shelest et al. |
| 2004/0254921 A1 | 12/2004 | Cohen et al. |
| 2004/0260769 A1 | 12/2004 | Yamamoto |
| 2004/0267906 A1 | 12/2004 | Truty |
| 2004/0267907 A1 | 12/2004 | Gustafsson |
| 2005/0004945 A1 | 1/2005 | Cossins et al. |
| 2005/0010653 A1 | 1/2005 | McCanne |
| 2005/0010961 A1 | 1/2005 | Hagen et al. |
| 2005/0015471 A1 | 1/2005 | Zhang et al. |
| 2005/0021706 A1 | 1/2005 | Maggi et al. |
| 2005/0021862 A1 | 1/2005 | Schroeder et al. |
| 2005/0027882 A1 | 1/2005 | Sullivan et al. |
| 2005/0038967 A1 | 2/2005 | Umbehocker et al. |
| 2005/0039019 A1 | 2/2005 | Delany |
| 2005/0044270 A1 | 2/2005 | Grove et al. |
| 2005/0076137 A1 | 4/2005 | Tang et al. |
| 2005/0102683 A1 | 4/2005 | Branson et al. |
| 2005/0097445 A1 | 5/2005 | Day et al. |
| 2005/0108169 A1 | 5/2005 | Balasubramanian et al. |
| 2005/0108262 A1 | 5/2005 | Fawcett |
| 2005/0108529 A1 | 5/2005 | Juneau |
| 2005/0114296 A1 | 5/2005 | Farber et al. |
| 2005/0117717 A1 | 5/2005 | Lumsden |
| 2005/0132083 A1 | 6/2005 | Raciborski et al. |
| 2005/0147088 A1 | 6/2005 | Bao et al. |
| 2005/0149529 A1 | 7/2005 | Gutmans |
| 2005/0157712 A1 | 7/2005 | Rangarajan et al. |
| 2005/0160133 A1 | 7/2005 | Greenlee et al. |
| 2005/0163168 A1 | 7/2005 | Sheth et al. |
| 2005/0168782 A1 | 7/2005 | Kobashi et al. |
| 2005/0171959 A1 | 8/2005 | Deforche et al. |
| 2005/0172080 A1 | 8/2005 | Miyauchi |
| 2005/0174989 A1 | 8/2005 | Chen et al. |
| 2005/0181769 A1 | 8/2005 | Kogawa |
| 2005/0188073 A1 | 8/2005 | Nakamichi et al. |
| 2005/0192814 A1 | 8/2005 | Challener et al. |
| 2005/0192008 A1 | 9/2005 | Desai et al. |
| 2005/0198170 A1 | 9/2005 | LeMay et al. |
| 2005/0198200 A1 | 9/2005 | Subramanian et al. |
| 2005/0198303 A1 | 9/2005 | Knauerhase et al. |
| 2005/0198334 A1 | 9/2005 | Farber et al. |
| 2005/0198453 A1 | 9/2005 | Osaki |
| 2005/0198571 A1 | 9/2005 | Kramer et al. |
| 2005/0201302 A1 | 9/2005 | Gaddis et al. |
| 2005/0216483 A1 | 9/2005 | Armstrong et al. |
| 2005/0216569 A1 | 9/2005 | Coppola et al. |
| 2005/0216674 A1 | 9/2005 | Robbin et al. |
| 2005/0223095 A1 | 10/2005 | Volz et al. |
| 2005/0228856 A1 | 10/2005 | Swildens et al. |
| 2005/0229119 A1 | 10/2005 | Torvinen |
| 2005/0232165 A1 | 10/2005 | Brawn et al. |
| 2005/0234864 A1 | 10/2005 | Shapiro |
| 2005/0240574 A1 | 10/2005 | Challenger et al. |
| 2005/0256880 A1 | 10/2005 | Nam Koong et al. |
| 2005/0259645 A1 | 11/2005 | Chen et al. |
| 2005/0259672 A1 | 11/2005 | Eduri |
| 2005/0262248 A1 | 11/2005 | Jennings, III et al. |
| 2005/0266835 A1 | 11/2005 | Agrawal et al. |
| 2005/0267928 A1 | 12/2005 | Anderson et al. |
| 2005/0267937 A1 | 12/2005 | Daniels et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2005/0286564 A1 | 12/2005 | Hatley et al. |
| 2006/0005014 A1 | 1/2006 | Aura et al. |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0020807 A1 | 1/2006 | Aura et al. |
| 2006/0021001 A1 | 1/2006 | Giles et al. |
| 2006/0026067 A1 | 1/2006 | Nicholas et al. |
| 2006/0026154 A1 | 2/2006 | Altinel et al. |
| 2006/0026592 A1 | 2/2006 | Simonen et al. |
| 2006/0031239 A1 | 2/2006 | Koenig |
| 2006/0031319 A1 | 2/2006 | Nelson et al. |
| 2006/0031503 A1 | 2/2006 | Gilbert |
| 2006/0034494 A1 | 2/2006 | Holloran |
| 2006/0036720 A1 | 2/2006 | Faulk, Jr. |
| 2006/0036966 A1 | 2/2006 | Yevdayev |
| 2006/0037037 A1 | 2/2006 | Miranz |
| 2006/0039352 A1 | 2/2006 | Karstens |
| 2006/0041614 A1 | 2/2006 | Oe |
| 2006/0045005 A1 | 2/2006 | Blackmore et al. |
| 2006/0047787 A1 | 3/2006 | Aggarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0074750 A1 | 3/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0088026 A1 | 4/2006 | Mazur et al. |
| 2006/0106938 A1 | 4/2006 | Dini et al. |
| 2006/0107036 A1 | 5/2006 | Randle et al. |
| 2006/0112066 A1 | 5/2006 | Hamzy |
| 2006/0112176 A1 | 5/2006 | Liu et al. |
| 2006/0120385 A1 | 5/2006 | Atchison et al. |
| 2006/0129665 A1 | 6/2006 | Toebes et al. |
| 2006/0129766 A1 | 6/2006 | Cassia et al. |

(56) References Cited

U.S. PATENT DOCUMENTS

| | | |
|---|---|---|
| 2006/0136453 A1 | 6/2006 | Kwan |
| 2006/0143293 A1 | 6/2006 | Freedman |
| 2006/0143442 A1 | 6/2006 | Smith |
| 2006/0146820 A1 | 6/2006 | Friedman et al. |
| 2006/0149529 A1 | 7/2006 | Nguyen et al. |
| 2006/0155823 A1 | 7/2006 | Tran et al. |
| 2006/0155862 A1 | 7/2006 | Kathi et al. |
| 2006/0161541 A1 | 7/2006 | Cencini |
| 2006/0165051 A1 | 7/2006 | Banerjee et al. |
| 2006/0168088 A1 | 7/2006 | Leighton et al. |
| 2006/0168240 A1 | 7/2006 | Olshefski |
| 2006/0173957 A1 | 7/2006 | Robinson |
| 2006/0173855 A1 | 8/2006 | Turner et al. |
| 2006/0179080 A1 | 8/2006 | Meek et al. |
| 2006/0184936 A1 | 8/2006 | Abels et al. |
| 2006/0188097 A1 | 8/2006 | Taniguchi et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0206568 A1 | 8/2006 | Verma et al. |
| 2006/0206586 A1 | 9/2006 | Ling et al. |
| 2006/0218265 A1 | 9/2006 | Farber et al. |
| 2006/0218304 A1 | 9/2006 | Mukherjee et al. |
| 2006/0221971 A1 | 9/2006 | Andrieux et al. |
| 2006/0224752 A1 | 10/2006 | Parekh et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |
| 2006/0230265 A1 | 10/2006 | Krishna |
| 2006/0233155 A1 | 10/2006 | Srivastava |
| 2006/0235941 A1 | 10/2006 | Arcas et al. |
| 2006/0242227 A1 | 10/2006 | Rao |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 11/2006 | Lewin et al. |
| 2006/0070060 A1 | 12/2006 | Tantawi et al. |
| 2006/0282505 A1 | 12/2006 | Hasha et al. |
| 2006/0288119 A1 | 12/2006 | Kim et al. |
| 2006/0288424 A1 | 12/2006 | Saito |
| 2007/0005689 A1 | 1/2007 | Leighton et al. |
| 2007/0005801 A1 | 1/2007 | Kumar et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0021998 A1 | 1/2007 | Laithwaite et al. |
| 2007/0028001 A1 | 1/2007 | Phillips et al. |
| 2007/0038729 A1 | 2/2007 | Sullivan et al. |
| 2007/0038994 A1 | 2/2007 | Davis et al. |
| 2007/0041393 A1 | 2/2007 | Westhead et al. |
| 2007/0043667 A1 | 2/2007 | Qawami et al. |
| 2007/0043859 A1 | 2/2007 | Ruul |
| 2007/0050522 A1 | 2/2007 | Grove et al. |
| 2007/0050703 A1 | 3/2007 | Lebel |
| 2007/0055764 A1 | 3/2007 | Dilley et al. |
| 2007/0055765 A1 | 3/2007 | Lisiecki et al. |
| 2007/0061440 A1 | 3/2007 | Sundaram et al. |
| 2007/0064610 A1 | 3/2007 | Khandani |
| 2007/0076872 A1 | 3/2007 | Juneau |
| 2007/0086429 A1 | 4/2007 | Lawrence et al. |
| 2007/0094361 A1 | 4/2007 | Hoynowski et al. |
| 2007/0101377 A1 | 4/2007 | Six et al. |
| 2007/0101061 A1 | 5/2007 | Baskaran et al. |
| 2007/0118667 A1 | 5/2007 | McCarthy et al. |
| 2007/0118668 A1 | 5/2007 | McCarthy et al. |
| 2007/0124309 A1 | 5/2007 | Takase et al. |
| 2007/0134641 A1 | 5/2007 | Lieu |
| 2007/0156726 A1 | 6/2007 | Levy |
| 2007/0156919 A1 | 7/2007 | Potti et al. |
| 2007/0162331 A1 | 7/2007 | Sullivan |
| 2007/0168336 A1 | 7/2007 | Ransil et al. |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 7/2007 | Wong et al. |
| 2007/0195800 A1 | 8/2007 | Yang et al. |
| 2007/0198982 A1 | 8/2007 | Bolan et al. |
| 2007/0204107 A1 | 8/2007 | Greenfield et al. |
| 2007/0208737 A1 | 8/2007 | Li et al. |
| 2007/0214232 A1 | 9/2007 | Belimpasakis et al. |
| 2007/0219795 A1 | 9/2007 | Park et al. |
| 2007/0220010 A1 | 9/2007 | Ertugrul |
| 2007/0226294 A1 | 9/2007 | Pruitt et al. |
| 2007/0233705 A1 | 9/2007 | Farber et al. |
| 2007/0233706 A1 | 10/2007 | Farber et al. |
| 2007/0233846 A1 | 10/2007 | Farber et al. |
| 2007/0233884 A1 | 10/2007 | Farber et al. |
| 2007/0233896 A1 | 10/2007 | Hilt et al. |
| 2007/0242824 A1 | 10/2007 | Vishik |
| 2007/0243860 A1 | 10/2007 | Aiello et al. |
| 2007/0244964 A1 | 10/2007 | Challenger et al. |
| 2007/0245022 A1 | 10/2007 | Olliphant et al. |
| 2007/0250467 A1 | 10/2007 | Mesnik et al. |
| 2007/0250468 A1 | 10/2007 | Pieper |
| 2007/0250560 A1 | 10/2007 | Wein et al. |
| 2007/0250601 A1 | 10/2007 | Amlekar et al. |
| 2007/0250611 A1 | 10/2007 | Bhogal et al. |
| 2007/0253377 A1 | 10/2007 | Janneteau et al. |
| 2007/0255843 A1 | 11/2007 | Zubev |
| 2007/0263604 A1 | 11/2007 | Tal |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0270165 A1 | 11/2007 | Poosala |
| 2007/0271375 A1 | 11/2007 | Hwang |
| 2007/0271385 A1 | 11/2007 | Davis et al. |
| 2007/0271560 A1 | 11/2007 | Wahlert et al. |
| 2007/0271608 A1 | 11/2007 | Shimizu et al. |
| 2007/0280197 A1 | 11/2007 | Pearlman et al. |
| 2007/0280229 A1 | 12/2007 | Kenney |
| 2007/0281689 A1 | 12/2007 | Altman et al. |
| 2007/0288588 A1* | 12/2007 | Wein .................. H04L 67/1001 709/214 |
| 2007/0291739 A1 | 12/2007 | Sullivan et al. |
| 2007/0294419 A1 | 12/2007 | Ulevitch |
| 2008/0005057 A1 | 1/2008 | Ozzie et al. |
| 2008/0005275 A1 | 1/2008 | Overton et al. |
| 2008/0008089 A1 | 1/2008 | Bornstein et al. |
| 2008/0016233 A1 | 1/2008 | Schneider |
| 2008/0028463 A1 | 1/2008 | Dagon et al. |
| 2008/0222647 A1 | 1/2008 | Taylor et al. |
| 2008/0037536 A1 | 2/2008 | Padmanabhan et al. |
| 2008/0046550 A1 | 2/2008 | Mazur et al. |
| 2008/0046596 A1 | 2/2008 | Afergan et al. |
| 2008/0049615 A1 | 2/2008 | Bugenhagen |
| 2008/0056207 A1 | 2/2008 | Eriksson et al. |
| 2008/0062997 A1 | 3/2008 | Nix |
| 2008/0065724 A1 | 3/2008 | Seed et al. |
| 2008/0065745 A1 | 3/2008 | Leighton et al. |
| 2008/0066072 A1 | 3/2008 | Yurekli et al. |
| 2008/0071859 A1 | 3/2008 | Seed et al. |
| 2008/0071925 A1 | 3/2008 | Leighton et al. |
| 2008/0071987 A1 | 3/2008 | Karn et al. |
| 2008/0072264 A1 | 3/2008 | Crayford |
| 2008/0082551 A1 | 3/2008 | Farber et al. |
| 2008/0082662 A1 | 4/2008 | Dandliker et al. |
| 2008/0086434 A1 | 4/2008 | Chesla |
| 2008/0086559 A1 | 4/2008 | Davis et al. |
| 2008/0086574 A1 | 4/2008 | Raciborski et al. |
| 2008/0092242 A1 | 4/2008 | Rowley |
| 2008/0101358 A1 | 4/2008 | Van Ewijk et al. |
| 2008/0103805 A1 | 5/2008 | Shear et al. |
| 2008/0104268 A1 | 5/2008 | Farber et al. |
| 2008/0109679 A1 | 5/2008 | Wright et al. |
| 2008/0114829 A1 | 5/2008 | Button et al. |
| 2008/0125077 A1 | 5/2008 | Velazquez et al. |

(56) References Cited

U.S. PATENT DOCUMENTS

| | | |
|---|---|---|
| 2008/0126706 A1 | 5/2008 | Newport et al. |
| 2008/0134043 A1 | 5/2008 | Georgis et al. |
| 2008/0140800 A1 | 6/2008 | Farber et al. |
| 2008/0147866 A1 | 6/2008 | Stolorz et al. |
| 2008/0147873 A1 | 6/2008 | Matsumoto |
| 2008/0155059 A1 | 6/2008 | Hardin et al. |
| 2008/0155061 A1 | 6/2008 | Afergan et al. |
| 2008/0155613 A1 | 6/2008 | Benya et al. |
| 2008/0155614 A1 | 6/2008 | Cooper et al. |
| 2008/0155694 A1 | 6/2008 | Kwon et al. |
| 2008/0162667 A1 | 6/2008 | Verma et al. |
| 2008/0162821 A1 | 7/2008 | Duran et al. |
| 2008/0162843 A1 | 7/2008 | Davis et al. |
| 2008/0172488 A1 | 7/2008 | Jawahar et al. |
| 2008/0175222 A1 | 7/2008 | Barnea et al. |
| 2008/0184357 A1 | 7/2008 | Drako et al. |
| 2008/0189437 A1 | 7/2008 | Halley |
| 2008/0201332 A1 | 8/2008 | Souders et al. |
| 2008/0201401 A1 | 8/2008 | Pugh et al. |
| 2008/0201711 A1 | 8/2008 | Amir Husain |
| 2008/0025304 A1 | 9/2008 | Venkataswami et al. |
| 2008/0215718 A1 | 9/2008 | Stolorz et al. |
| 2008/0215730 A1 | 9/2008 | Sundaram et al. |
| 2008/0215735 A1 | 9/2008 | Farber et al. |
| 2008/0215747 A1 | 9/2008 | Menon et al. |
| 2008/0215750 A1 | 9/2008 | Farber et al. |
| 2008/0215755 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0225779 A1 | 9/2008 | Bragiel et al. |
| 2008/0228574 A1 | 9/2008 | Stewart et al. |
| 2008/0228920 A1 | 9/2008 | Souders et al. |
| 2008/0235383 A1 | 9/2008 | Schneider |
| 2008/0235400 A1 | 9/2008 | Slocombe et al. |
| 2008/0256087 A1 | 10/2008 | Piironen et al. |
| 2008/0256175 A1 | 10/2008 | Lee et al. |
| 2008/0263135 A1 | 10/2008 | Olliphant |
| 2008/0270882 A1 | 10/2008 | Rollins et al. |
| 2008/0275772 A1 | 10/2008 | Suryanarayana et al. |
| 2008/0281946 A1 | 11/2008 | Swildens et al. |
| 2008/0281950 A1 | 11/2008 | Wald et al. |
| 2008/0288458 A1 | 11/2008 | Sun et al. |
| 2008/0288722 A1 | 11/2008 | Lecoq et al. |
| 2008/0301670 A1 | 11/2008 | Gouge et al. |
| 2008/0312766 A1 | 12/2008 | Couckuyt |
| 2008/0319862 A1 | 12/2008 | Golan et al. |
| 2008/0320123 A1 | 12/2008 | Houlihan et al. |
| 2008/0320269 A1 | 12/2008 | Houlihan et al. |
| 2009/0013063 A1 | 1/2009 | Soman |
| 2009/0013321 A1 | 1/2009 | Mattiocco et al. |
| 2009/0016236 A1 | 1/2009 | Alcala et al. |
| 2009/0029644 A1 | 1/2009 | Sue et al. |
| 2009/0031042 A1 | 1/2009 | Phatak |
| 2009/0031367 A1 | 1/2009 | Sue |
| 2009/0031368 A1 | 1/2009 | Ling |
| 2009/0031376 A1 | 1/2009 | Riley et al. |
| 2009/0043900 A1 | 2/2009 | Barber |
| 2009/0049098 A1 | 2/2009 | Pickelsimer et al. |
| 2009/0063038 A1 | 2/2009 | Shrivathsan et al. |
| 2009/0063704 A1 | 3/2009 | Taylor et al. |
| 2009/0070533 A1 | 3/2009 | Elazary et al. |
| 2009/0083228 A1 | 3/2009 | Shatz et al. |
| 2009/0083279 A1 | 3/2009 | Hasek |
| 2009/0083413 A1 | 3/2009 | Levow et al. |
| 2009/0086728 A1 | 3/2009 | Gulati et al. |
| 2009/0086741 A1 | 4/2009 | Zhang |
| 2009/0089869 A1 | 4/2009 | Varghese |
| 2009/0094252 A1 | 4/2009 | Wong et al. |
| 2009/0103707 A1 | 4/2009 | McGary et al. |
| 2009/0106202 A1 | 4/2009 | Mizrahi |
| 2009/0106381 A1 | 4/2009 | Kasriel et al. |
| 2009/0109854 A1 | 4/2009 | Rajpathak |
| 2009/0112703 A1 | 4/2009 | Brown |
| 2009/0125393 A1 | 5/2009 | Hwang et al. |
| 2009/0125902 A1 | 5/2009 | Ghosh et al. |
| 2009/0125934 A1 | 5/2009 | Jones et al. |
| 2009/0132368 A1 | 5/2009 | Cotter et al. |
| 2009/0132640 A1 | 5/2009 | Verma et al. |
| 2009/0132648 A1 | 5/2009 | Swildens et al. |
| 2009/0138533 A1 | 5/2009 | Iwasaki et al. |
| 2009/0138582 A1 | 5/2009 | Turk |
| 2009/0144411 A1 | 5/2009 | Winkler et al. |
| 2009/0144412 A1 | 6/2009 | Ferguson et al. |
| 2009/0144496 A1 | 6/2009 | Kawaguchi |
| 2009/0150926 A1 | 6/2009 | Schlack |
| 2009/0157504 A1 | 6/2009 | Braemer et al. |
| 2009/0157850 A1 | 6/2009 | Gagliardi et al. |
| 2009/0157899 A1 | 6/2009 | Gagliardi et al. |
| 2009/0158163 A1 | 6/2009 | Stephens et al. |
| 2009/0164331 A1 | 6/2009 | Bishop et al. |
| 2009/0164614 A1 | 6/2009 | Christian et al. |
| 2009/0177667 A1 | 6/2009 | Ramos et al. |
| 2009/0172167 A1 | 7/2009 | Drai et al. |
| 2009/0182815 A1 | 7/2009 | Czechowski et al. |
| 2009/0182837 A1 | 7/2009 | Rogers |
| 2009/0182945 A1 | 7/2009 | Aviles et al. |
| 2009/0187575 A1 | 7/2009 | DaCosta |
| 2009/0198817 A1 | 7/2009 | Sundaram et al. |
| 2009/0204682 A1 | 8/2009 | Jeyaseelan et al. |
| 2009/0210549 A1 | 8/2009 | Hudson et al. |
| 2009/0228708 A1 | 8/2009 | Trostle |
| 2009/0233623 A1 | 9/2009 | Johnson |
| 2009/0241167 A1 | 9/2009 | Moore |
| 2009/0248697 A1 | 9/2009 | Richardson et al. |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0249222 A1 | 10/2009 | Schmidt et al. |
| 2009/0253435 A1 | 10/2009 | Olofsson |
| 2009/0254661 A1 | 10/2009 | Fullagar et al. |
| 2009/0254989 A1 | 10/2009 | Achan et al. |
| 2009/0259588 A1 | 10/2009 | Lindsay |
| 2009/0259971 A1 | 10/2009 | Rankine et al. |
| 2009/0262741 A1 | 10/2009 | Jungck et al. |
| 2009/0265707 A1 | 10/2009 | Goodman et al. |
| 2009/0265786 A1 | 10/2009 | Xie et al. |
| 2009/0271498 A1 | 10/2009 | Cable |
| 2009/0271577 A1 | 10/2009 | Campana et al. |
| 2009/0271730 A1 | 10/2009 | Rose et al. |
| 2009/0276771 A1 | 10/2009 | Nickolov et al. |
| 2009/0279444 A1 | 11/2009 | Ravindran et al. |
| 2009/0282038 A1 | 11/2009 | Subotin et al. |
| 2009/0287750 A1 | 11/2009 | Banavar et al. |
| 2009/0307307 A1 | 11/2009 | Igarashi |
| 2009/0327489 A1 | 12/2009 | Swildens et al. |
| 2009/0327517 A1 | 12/2009 | Sivasubramanian et al. |
| 2009/0327914 A1 | 12/2009 | Adar et al. |
| 2010/0005175 A1 | 1/2010 | Swildens et al. |
| 2010/0011061 A1 | 1/2010 | Hudson et al. |
| 2010/0011126 A1 | 1/2010 | Hsu et al. |
| 2010/0020699 A1 | 1/2010 | On |
| 2010/0023601 A1 | 1/2010 | Lewin et al. |
| 2010/0023621 A1 | 1/2010 | Ezolt et al. |
| 2010/0030662 A1 | 1/2010 | Klein |
| 2010/0030914 A1 | 2/2010 | Sparks et al. |
| 2010/0034381 A1 | 2/2010 | Trace et al. |
| 2010/0034470 A1 | 2/2010 | Valencia-Campo et al. |
| 2010/0036944 A1 | 2/2010 | Douglis et al. |
| 2010/0037314 A1 | 2/2010 | Perdisci et al. |
| 2010/0042725 A1 | 2/2010 | Jeon et al. |
| 2010/0049862 A1 | 2/2010 | Dixon |
| 2010/0057894 A1 | 2/2010 | Glasser |
| 2010/0058352 A1 | 3/2010 | Esfahany et al. |
| 2010/0070603 A1 | 3/2010 | Moss et al. |
| 2010/0070700 A1 | 3/2010 | Borst et al. |
| 2010/0074268 A1 | 3/2010 | Raza |
| 2010/0082320 A1 | 3/2010 | Wood et al. |
| 2010/0082787 A1 | 4/2010 | Kommula et al. |
| 2010/0088367 A1 | 4/2010 | Brown et al. |
| 2010/0088405 A1 | 4/2010 | Huang et al. |
| 2010/0095008 A1 | 4/2010 | Joshi |

(56) References Cited

U.S. PATENT DOCUMENTS

| | | |
|---|---|---|
| 2010/0100629 A1 | 4/2010 | Raciborski et al. |
| 2010/0103837 A1 | 4/2010 | Jungck et al. |
| 2010/0111059 A1 | 4/2010 | Bappu et al. |
| 2010/0161564 A1 | 4/2010 | Lee et al. |
| 2010/0115133 A1 | 5/2010 | Joshi |
| 2010/0115342 A1 | 5/2010 | Shigeta et al. |
| 2010/0121953 A1 | 5/2010 | Friedman et al. |
| 2010/0121981 A1 | 5/2010 | Drako |
| 2010/0122069 A1 | 5/2010 | Gonion |
| 2010/0125626 A1 | 5/2010 | Lucas et al. |
| 2010/0125673 A1 | 5/2010 | Richardson et al. |
| 2010/0125675 A1 | 5/2010 | Richardson et al. |
| 2010/0131646 A1 | 5/2010 | Drako |
| 2010/0138559 A1 | 5/2010 | Sullivan et al. |
| 2010/0106934 A1 | 6/2010 | Calder et al. |
| 2010/0138921 A1 | 6/2010 | Na et al. |
| 2010/0150155 A1 | 6/2010 | Napierala |
| 2010/0161565 A1 | 6/2010 | Lee et al. |
| 2010/0161799 A1 | 6/2010 | Maloo |
| 2010/0169392 A1 | 6/2010 | Lev Ran et al. |
| 2010/0169452 A1 | 7/2010 | Atluri et al. |
| 2010/0174811 A1 | 7/2010 | Musiri et al. |
| 2010/0191854 A1 | 7/2010 | Isci et al. |
| 2010/0192225 A1 | 7/2010 | Ma et al. |
| 2010/0217801 A1 | 8/2010 | Leighton et al. |
| 2010/0217856 A1 | 8/2010 | Falkena |
| 2010/0223364 A1 | 8/2010 | Wei |
| 2010/0226372 A1 | 9/2010 | Watanabe |
| 2010/0228819 A1 | 9/2010 | Wei |
| 2010/0235915 A1 | 9/2010 | Memon et al. |
| 2010/0250710 A1 | 9/2010 | Cadwell et al. |
| 2010/0257024 A1 | 9/2010 | Holmes et al. |
| 2010/0257266 A1 | 10/2010 | Holmes et al. |
| 2010/0257566 A1 | 10/2010 | Matila |
| 2010/0262964 A1 | 10/2010 | Uyeda et al. |
| 2010/0268789 A1 | 10/2010 | Yoo et al. |
| 2010/0268814 A1 | 10/2010 | Cross et al. |
| 2010/0274765 A1 | 10/2010 | Murphy et al. |
| 2010/0281482 A1 | 10/2010 | Pike et al. |
| 2010/0293296 A1 | 11/2010 | Hsu et al. |
| 2010/0293479 A1 | 11/2010 | Rousso et al. |
| 2010/0299427 A1 | 11/2010 | Joshi |
| 2010/0299438 A1 | 11/2010 | Zimmerman et al. |
| 2010/0299439 A1 | 11/2010 | McCarthy et al. |
| 2010/0306382 A1 | 11/2010 | Cardosa et al. |
| 2010/0312861 A1 | 12/2010 | Kolhi et al. |
| 2010/0318508 A1 | 12/2010 | Brawer et al. |
| 2010/0322255 A1 | 12/2010 | Hao et al. |
| 2010/0325365 A1 | 12/2010 | Colglazier et al. |
| 2010/0332595 A1 | 12/2010 | Fullagar et al. |
| 2010/0332601 A1 | 12/2010 | Walter et al. |
| 2010/0332658 A1 | 12/2010 | Elyashev |
| 2011/0010244 A1 | 1/2011 | Hatridge |
| 2011/0016214 A1 | 1/2011 | Jackson |
| 2011/0029598 A1 | 1/2011 | Arnold et al. |
| 2011/0029398 A1 | 2/2011 | Boudville |
| 2011/0035469 A1 | 2/2011 | Smith et al. |
| 2011/0040893 A1 | 2/2011 | Karaoguz et al. |
| 2011/0051738 A1 | 2/2011 | Xu |
| 2011/0055386 A1 | 3/2011 | Middleton et al. |
| 2011/0055714 A1 | 3/2011 | Vemulapalli et al. |
| 2011/0055921 A1 | 3/2011 | Narayanaswamy et al. |
| 2011/0057790 A1 | 3/2011 | Martin et al. |
| 2011/0058675 A1 | 3/2011 | Brueck et al. |
| 2011/0072138 A1 | 3/2011 | Canturk et al. |
| 2011/0072366 A1 | 3/2011 | Spencer |
| 2011/0078000 A1 | 3/2011 | Ma et al. |
| 2011/0078230 A1 | 3/2011 | Sepulveda |
| 2011/0085654 A1 | 3/2011 | Jana et al. |
| 2011/0082916 A1 | 4/2011 | Swanson et al. |
| 2011/0087769 A1 | 4/2011 | Holmes et al. |
| 2011/0093584 A1 | 4/2011 | Qiu et al. |
| 2011/0096987 A1 | 4/2011 | Morales et al. |
| 2011/0099294 A1 | 4/2011 | Kapur et al. |
| 2011/0106949 A1 | 4/2011 | Patel et al. |
| 2011/0113467 A1 | 5/2011 | Agarwal et al. |
| 2011/0125894 A1 | 5/2011 | Anderson et al. |
| 2011/0153938 A1 | 6/2011 | Verzunov et al. |
| 2011/0153941 A1 | 6/2011 | Spatscheck et al. |
| 2011/0154318 A1 | 6/2011 | Oshins et al. |
| 2011/0154350 A1 | 6/2011 | Doyle et al. |
| 2011/0161461 A1 | 6/2011 | Niven-Jenkins |
| 2011/0166935 A1 | 6/2011 | Armentrout et al. |
| 2011/0182290 A1 | 7/2011 | Perkins |
| 2011/0191445 A1 | 7/2011 | Dazzi |
| 2011/0191446 A1 | 8/2011 | Dazzi et al. |
| 2011/0191447 A1 | 8/2011 | Dazzi et al. |
| 2011/0191449 A1 | 8/2011 | Swildens et al. |
| 2011/0191459 A1 | 8/2011 | Joshi |
| 2011/0196892 A1 | 8/2011 | Xia |
| 2011/0202705 A1 | 8/2011 | Hayashi et al. |
| 2011/0208876 A1 | 8/2011 | Richardson et al. |
| 2011/0208958 A1 | 8/2011 | Stuedi et al. |
| 2011/0209064 A1 | 8/2011 | Jorgensen et al. |
| 2011/0219120 A1 | 8/2011 | Farber et al. |
| 2011/0219372 A1 | 9/2011 | Agarwal et al. |
| 2011/0238501 A1 | 9/2011 | Almeida |
| 2011/0238793 A1 | 9/2011 | Bedare et al. |
| 2011/0239215 A1 | 9/2011 | Sugai |
| 2011/0252142 A1 | 9/2011 | Richardson et al. |
| 2011/0252143 A1 | 10/2011 | Baumback et al. |
| 2011/0255445 A1 | 10/2011 | Johnson et al. |
| 2011/0258049 A1 | 10/2011 | Ramer et al. |
| 2011/0258614 A1 | 10/2011 | Tamm |
| 2011/0270964 A1 | 10/2011 | Huang et al. |
| 2011/0276623 A1 | 11/2011 | Girbal |
| 2011/0282988 A1 | 11/2011 | Wang et al. |
| 2011/0296053 A1 | 11/2011 | Medved et al. |
| 2011/0295940 A1 | 12/2011 | Saleem et al. |
| 2011/0295942 A1 | 12/2011 | Raghunath et al. |
| 2011/0296370 A1 | 12/2011 | Ferris et al. |
| 2011/0296473 A1 | 12/2011 | Babic |
| 2011/0302304 A1 | 12/2011 | Baumback et al. |
| 2011/0307533 A1 | 12/2011 | Saeki |
| 2011/0320522 A1 | 12/2011 | Endres et al. |
| 2011/0320559 A1 | 12/2011 | Foti |
| 2012/0005673 A1 | 1/2012 | Cervantes et al. |
| 2012/0011190 A1 | 1/2012 | Driesen et al. |
| 2012/0011509 A1 | 1/2012 | Husain |
| 2012/0014249 A1 | 1/2012 | Mao et al. |
| 2012/0023226 A1 | 1/2012 | Petersen et al. |
| 2012/0036238 A1 | 1/2012 | Sundaram et al. |
| 2012/0031626 A1 | 2/2012 | Clayton et al. |
| 2012/0041899 A1 | 2/2012 | Greene et al. |
| 2012/0041970 A1 | 2/2012 | Ghosh et al. |
| 2012/0042381 A1 | 2/2012 | Antonakakis et al. |
| 2012/0054860 A1 | 2/2012 | Wyschogrod et al. |
| 2012/0066360 A1 | 3/2012 | Ghosh |
| 2012/0066681 A1 | 3/2012 | Levy et al. |
| 2012/0072600 A1 | 3/2012 | Richardson et al. |
| 2012/0072608 A1 | 3/2012 | Peters et al. |
| 2012/0078998 A1 | 3/2012 | Son et al. |
| 2012/0079096 A1 | 3/2012 | Cowan et al. |
| 2012/0079115 A1 | 3/2012 | Richardson et al. |
| 2012/0089700 A1 | 3/2012 | Safruti et al. |
| 2012/0023090 A1 | 4/2012 | Holloway et al. |
| 2012/0089972 A1 | 4/2012 | Scheidel et al. |
| 2012/0096065 A1 | 4/2012 | Suit et al. |
| 2012/0096166 A1 | 4/2012 | Devarapalli et al. |
| 2012/0110515 A1 | 4/2012 | Abramoff et al. |
| 2012/0117621 A1 | 5/2012 | Kondamuru et al. |
| 2012/0124184 A1 | 5/2012 | Sakata et al. |
| 2012/0131177 A1 | 5/2012 | Brandt et al. |
| 2012/0136697 A1 | 5/2012 | Peles et al. |
| 2012/0142310 A1 | 5/2012 | Pugh et al. |
| 2012/0143688 A1 | 6/2012 | Alexander |
| 2012/0159476 A1 | 6/2012 | Ramteke et al. |
| 2012/0166516 A1 | 6/2012 | Simmons et al. |
| 2012/0169646 A1 | 6/2012 | Berkes et al. |
| 2012/0173760 A1 | 7/2012 | Jog et al. |
| 2012/0179796 A1 | 7/2012 | Nagaraj et al. |
| 2012/0179817 A1 | 7/2012 | Bade et al. |
| 2012/0179839 A1 | 7/2012 | Raciborski et al. |
| 2012/0198043 A1 | 7/2012 | Hesketh et al. |

(56) References Cited

U.S. PATENT DOCUMENTS

| | | |
|---|---|---|
| 2012/0198071 A1 | 8/2012 | Black et al. |
| 2012/0204176 A1 | 8/2012 | Tian et al. |
| 2012/0209942 A1 | 8/2012 | Zehavi et al. |
| 2012/0222005 A1 | 8/2012 | Harris et al. |
| 2012/0224516 A1 | 8/2012 | Stojanovski et al. |
| 2012/0226649 A1 | 9/2012 | Kovacs et al. |
| 2012/0233329 A1 | 9/2012 | Dickinson et al. |
| 2012/0233522 A1 | 9/2012 | Barton et al. |
| 2012/0233668 A1 | 9/2012 | Leafe et al. |
| 2012/0239725 A1 | 9/2012 | Hartrick et al. |
| 2012/0246129 A1 | 9/2012 | Rothschild et al. |
| 2012/0246257 A1 | 9/2012 | Brown |
| 2012/0254961 A1 | 9/2012 | Kim et al. |
| 2012/0257628 A1 | 10/2012 | Bu et al. |
| 2012/0259954 A1 | 10/2012 | McCarthy et al. |
| 2012/0266231 A1* | 10/2012 | Spiers .................. H04L 9/3234 726/12 |
| 2012/0272224 A1 | 10/2012 | Brackman |
| 2012/0278229 A1 | 10/2012 | Vishwanathan et al. |
| 2012/0278831 A1 | 11/2012 | van Coppenolle et al. |
| 2012/0278833 A1 | 11/2012 | Tam |
| 2012/0297009 A1 | 11/2012 | Amir et al. |
| 2012/0303785 A1 | 11/2012 | Sivasubramanian et al. |
| 2012/0303804 A1 | 11/2012 | Sundaram et al. |
| 2012/0311648 A1 | 11/2012 | Swildens et al. |
| 2012/0317573 A1 | 12/2012 | Osogami et al. |
| 2012/0324089 A1 | 12/2012 | Joshi |
| 2013/0003547 A1 | 1/2013 | Motwani et al. |
| 2013/0003735 A1 | 1/2013 | Chao et al. |
| 2013/0007100 A1 | 1/2013 | Trahan et al. |
| 2013/0007101 A1 | 1/2013 | Trahan et al. |
| 2013/0007102 A1 | 1/2013 | Trahan et al. |
| 2013/0007241 A1 | 1/2013 | Trahan et al. |
| 2013/0007273 A1 | 1/2013 | Baumback et al. |
| 2013/0013764 A1 | 1/2013 | Li et al. |
| 2013/0018945 A1 | 1/2013 | Vendrow et al. |
| 2013/0019311 A1 | 1/2013 | Swildens et al. |
| 2013/0034099 A1 | 1/2013 | Hikichi et al. |
| 2013/0036307 A1 | 2/2013 | Gagliano et al. |
| 2013/0041872 A1 | 2/2013 | Aizman et al. |
| 2013/0042328 A1 | 2/2013 | Padinjareveetil |
| 2013/0046869 A1 | 2/2013 | Jenkins et al. |
| 2013/0046883 A1 | 2/2013 | Lientz et al. |
| 2013/0054675 A1 | 2/2013 | Jenkins et al. |
| 2013/0055374 A1 | 2/2013 | Kustarz et al. |
| 2013/0067530 A1 | 2/2013 | Spektor et al. |
| 2013/0061306 A1* | 3/2013 | Sinn .................. H04L 47/70 726/7 |
| 2013/0073808 A1 | 3/2013 | Puthalath et al. |
| 2013/0080420 A1 | 3/2013 | Taylor et al. |
| 2013/0080421 A1 | 3/2013 | Taylor et al. |
| 2013/0080576 A1 | 3/2013 | Taylor et al. |
| 2013/0080577 A1 | 3/2013 | Taylor et al. |
| 2013/0080623 A1 | 3/2013 | Thireault |
| 2013/0080627 A1 | 3/2013 | Kukreja et al. |
| 2013/0080636 A1 | 3/2013 | Friedman et al. |
| 2013/0086001 A1 | 3/2013 | Bhogal et al. |
| 2013/0084898 A1 | 4/2013 | Li et al. |
| 2013/0089005 A1 | 4/2013 | Li et al. |
| 2013/0095806 A1 | 4/2013 | Salkintzis et al. |
| 2013/0103834 A1 | 4/2013 | Dzerve et al. |
| 2013/0111035 A1 | 4/2013 | Alapati et al. |
| 2013/0117282 A1 | 5/2013 | Mugali, Jr. et al. |
| 2013/0117849 A1 | 5/2013 | Golshan et al. |
| 2013/0130221 A1 | 5/2013 | Kortemeyer et al. |
| 2013/0132854 A1 | 5/2013 | Raleigh et al. |
| 2013/0133057 A1 | 5/2013 | Yoon et al. |
| 2013/0136138 A1* | 5/2013 | Miller .................. H04L 45/306 370/395.53 |
| 2013/0151646 A1 | 5/2013 | Chidambaram et al. |
| 2013/0191499 A1 | 7/2013 | Ludin et al. |
| 2013/0198341 A1 | 8/2013 | Kim |
| 2013/0212300 A1 | 8/2013 | Eggleston et al. |
| 2013/0219020 A1 | 8/2013 | McCarthy et al. |
| 2013/0227165 A1 | 8/2013 | Liu |
| 2013/0227559 A1 | 8/2013 | Tsirkin |
| 2013/0246567 A1 | 8/2013 | Green et al. |
| 2013/0247061 A1 | 9/2013 | Kiehn |
| 2013/0254269 A1 | 9/2013 | Sivasubramanian et al. |
| 2013/0254879 A1 | 9/2013 | Chesla et al. |
| 2013/0263256 A1 | 9/2013 | Dickinson et al. |
| 2013/0268616 A1 | 10/2013 | Sakata et al. |
| 2013/0275549 A1 | 10/2013 | Field et al. |
| 2013/0279335 A1 | 10/2013 | Ahmadi |
| 2013/0283266 A1 | 10/2013 | Baset et al. |
| 2013/0305046 A1 | 10/2013 | Mankovski et al. |
| 2013/0305083 A1 | 11/2013 | Machida |
| 2013/0311555 A1 | 11/2013 | Laoutaris et al. |
| 2013/0311583 A1 | 11/2013 | Humphreys et al. |
| 2013/0311605 A1 | 11/2013 | Richardson et al. |
| 2013/0311989 A1 | 11/2013 | Ota et al. |
| 2013/0318525 A1 | 11/2013 | Palanisamy et al. |
| 2013/0339429 A1 | 11/2013 | Richardson et al. |
| 2013/0346465 A1 | 12/2013 | Maltz et al. |
| 2013/0346470 A1 | 12/2013 | Obstfeld et al. |
| 2013/0346567 A1 | 12/2013 | Richardson et al. |
| 2013/0346614 A1 | 12/2013 | Baughman et al. |
| 2014/0006465 A1 | 1/2014 | Davis et al. |
| 2014/0006577 A1 | 1/2014 | Joe et al. |
| 2014/0007239 A1 | 1/2014 | Sharpe et al. |
| 2014/0013403 A1 | 1/2014 | Shuster |
| 2014/0019605 A1 | 1/2014 | Boberg |
| 2014/0022951 A1 | 1/2014 | Lemieux |
| 2014/0032658 A1 | 1/2014 | Falls |
| 2014/0036675 A1 | 1/2014 | Wang et al. |
| 2014/0040478 A1 | 2/2014 | Hsu et al. |
| 2014/0047104 A1 | 2/2014 | Rodriguez |
| 2014/0053022 A1 | 2/2014 | Forgette et al. |
| 2014/0059198 A1 | 2/2014 | Richardson et al. |
| 2014/0059208 A1 | 2/2014 | Yan et al. |
| 2014/0059379 A1 | 2/2014 | Ren et al. |
| 2014/0082165 A1 | 2/2014 | Marr et al. |
| 2014/0082614 A1 | 3/2014 | Klein et al. |
| 2014/0089917 A1 | 3/2014 | Attalla et al. |
| 2014/0108672 A1 | 3/2014 | Ou et al. |
| 2014/0108474 A1* | 4/2014 | David .................. H04L 67/568 707/827 |
| 2014/0109095 A1 | 4/2014 | Farkash et al. |
| 2014/0122698 A1 | 4/2014 | Batrouni et al. |
| 2014/0119194 A1 | 5/2014 | Raciborski et al. |
| 2014/0122725 A1 | 5/2014 | Batrouni et al. |
| 2014/0137111 A1 | 5/2014 | Dees et al. |
| 2014/0143305 A1 | 5/2014 | Choi et al. |
| 2014/0149601 A1 | 5/2014 | Carney et al. |
| 2014/0164817 A1 | 5/2014 | Bartholomy et al. |
| 2014/0164584 A1 | 6/2014 | Joe et al. |
| 2014/0165061 A1 | 6/2014 | Greene et al. |
| 2014/0172944 A1 | 6/2014 | Newton et al. |
| 2014/0181268 A1 | 6/2014 | Stevens et al. |
| 2014/0195686 A1 | 6/2014 | Yeager et al. |
| 2014/0189069 A1 | 7/2014 | Gero et al. |
| 2014/0200036 A1 | 7/2014 | Egner et al. |
| 2014/0215019 A1 | 7/2014 | Ahrens |
| 2014/0244937 A1 | 8/2014 | Bloomstein et al. |
| 2014/0258523 A1 | 9/2014 | Kazerani et al. |
| 2014/0269371 A1 | 9/2014 | Badea et al. |
| 2014/0279852 A1 | 9/2014 | Chen |
| 2014/0280606 A1 | 9/2014 | Long |
| 2014/0280679 A1 | 9/2014 | Dey et al. |
| 2014/0297870 A1 | 9/2014 | Eggleston et al. |
| 2014/0297866 A1 | 10/2014 | Ennaji et al. |
| 2014/0298021 A1 | 10/2014 | Kwon et al. |
| 2014/0310402 A1 | 10/2014 | Giaretta et al. |
| 2014/0310811 A1 | 10/2014 | Hentunen |
| 2014/0324774 A1 | 10/2014 | Chen et al. |
| 2014/0325155 A1 | 10/2014 | Marshall et al. |
| 2014/0331328 A1 | 10/2014 | Wang et al. |
| 2014/0337472 A1 | 11/2014 | Newton et al. |
| 2014/0351413 A1 | 11/2014 | Smith et al. |
| 2014/0351871 A1 | 11/2014 | Bomfim et al. |
| 2015/0006615 A1 | 1/2015 | Wainner et al. |
| 2015/0019686 A1 | 1/2015 | Backholm |
| 2015/0026407 A1 | 1/2015 | Mclellan et al. |
| 2015/0067171 A1 | 1/2015 | Yum |

(56) References Cited

U.S. PATENT DOCUMENTS

| | | |
|---|---|---|
| 2015/0036493 A1 | 2/2015 | C J et al. |
| 2015/0074228 A1 | 3/2015 | Drake |
| 2015/0081877 A1 | 3/2015 | Sethi et al. |
| 2015/0088586 A1 | 3/2015 | Pavlas et al. |
| 2015/0088964 A1 | 3/2015 | Shiell et al. |
| 2015/0088972 A1 | 3/2015 | Brand et al. |
| 2015/0089621 A1 | 3/2015 | Khalid |
| 2015/0095516 A1 | 3/2015 | Bergman |
| 2015/0106864 A1 | 4/2015 | Li et al. |
| 2015/0154051 A1 | 4/2015 | Kruglick |
| 2015/0130813 A1 | 5/2015 | Taraki et al. |
| 2015/0149600 A1 | 5/2015 | Thibeault et al. |
| 2015/0149631 A1 | 5/2015 | Lissack |
| 2015/0156172 A1 | 6/2015 | Nandi et al. |
| 2015/0156279 A1 | 6/2015 | Vaswani et al. |
| 2015/0163273 A1 | 6/2015 | Radcliffe et al. |
| 2015/0180995 A1 | 6/2015 | Hofmann |
| 2015/0188734 A1 | 6/2015 | Petrov |
| 2015/0189042 A1 | 7/2015 | Sun et al. |
| 2015/0195244 A1 | 7/2015 | Richardson et al. |
| 2015/0200991 A1 | 7/2015 | Kwon |
| 2015/0215388 A1 | 7/2015 | Kontothanassis et al. |
| 2015/0215656 A1 | 7/2015 | Pulung et al. |
| 2015/0242397 A1 | 8/2015 | Zhuang |
| 2015/0244580 A1 | 8/2015 | Saavedra |
| 2015/0264009 A1 | 9/2015 | Scharber et al. |
| 2015/0271031 A1 | 9/2015 | Beevers |
| 2015/0281367 A1 | 10/2015 | Nygren et al. |
| 2015/0288647 A1 | 10/2015 | Chhabra et al. |
| 2015/0317118 A1 | 11/2015 | Orikasa et al. |
| 2015/0339136 A1* | 11/2015 | Suryanarayanan ..... G06F 9/452 718/1 |
| 2015/0341431 A1 | 11/2015 | Hartrick et al. |
| 2015/0358276 A1 | 11/2015 | Liu et al. |
| 2015/0347311 A1 | 12/2015 | Tanaka et al. |
| 2015/0350365 A1 | 12/2015 | Khakpour et al. |
| 2015/0358436 A1 | 12/2015 | Kim et al. |
| 2015/0363113 A1 | 12/2015 | Rahman et al. |
| 2015/0363282 A1 | 12/2015 | Rangasamy |
| 2016/0006645 A1 | 1/2016 | Rave |
| 2016/0006672 A1 | 1/2016 | Saavedra |
| 2016/0021197 A1 | 1/2016 | Pogrebinsky et al. |
| 2016/0028598 A1 | 1/2016 | Khakpour et al. |
| 2016/0028755 A1 | 1/2016 | Vasseur et al. |
| 2016/0036857 A1 | 1/2016 | Foxhoven et al. |
| 2016/0065475 A1 | 2/2016 | Hilt et al. |
| 2016/0072669 A1 | 3/2016 | Saavedra |
| 2016/0104346 A1 | 3/2016 | Ovalle et al. |
| 2016/0132600 A1 | 4/2016 | Woodhead et al. |
| 2016/0142251 A1 | 5/2016 | Contreras et al. |
| 2016/0182454 A1 | 5/2016 | Phonsa et al. |
| 2016/0164761 A1 | 6/2016 | Sathyanarayana et al. |
| 2016/0164799 A1 | 6/2016 | Popli et al. |
| 2016/0182542 A1 | 6/2016 | Staniford |
| 2016/0241639 A1 | 6/2016 | Brookins et al. |
| 2016/0253262 A1 | 8/2016 | Nadgowda |
| 2016/0255042 A1 | 9/2016 | Newton |
| 2016/0269927 A1 | 9/2016 | Kim et al. |
| 2016/0274929 A1 | 9/2016 | King |
| 2016/0294678 A1 | 9/2016 | Khakpour et al. |
| 2016/0337426 A1 | 10/2016 | Shribman et al. |
| 2016/0366202 A1 | 11/2016 | Phillips et al. |
| 2016/0373789 A1 | 12/2016 | Tsukagoshi |
| 2017/0024800 A1 | 1/2017 | Shah |
| 2017/0026338 A1* | 1/2017 | Leach .................... H04L 63/02 |
| 2017/0034254 A1 | 2/2017 | Salkintzis |
| 2017/0041333 A1 | 2/2017 | Mahjoub et al. |
| 2017/0041428 A1 | 2/2017 | Katsev |
| 2017/0099345 A1 | 3/2017 | Leach |
| 2017/0099254 A1 | 4/2017 | Leach et al. |
| 2017/0109316 A1 | 4/2017 | Hack et al. |
| 2017/0153980 A1 | 5/2017 | Araújo et al. |
| 2017/0155678 A1 | 6/2017 | Araújo et al. |
| 2017/0155732 A1 | 6/2017 | Araújo et al. |
| 2017/0163425 A1 | 6/2017 | Kaliski, Jr. |
| 2017/0170973 A1* | 6/2017 | Gill .................... H04L 63/0823 |
| 2017/0171146 A1 | 6/2017 | Sharma et al. |
| 2017/0180217 A1 | 6/2017 | Puchala et al. |
| 2017/0187768 A1 | 6/2017 | Huang et al. |
| 2017/0214761 A1 | 6/2017 | Hsu et al. |
| 2017/0257340 A1 | 7/2017 | Richardson et al. |
| 2017/0223029 A1* | 8/2017 | Sharma ............... H04L 63/1425 |
| 2017/0374121 A1 | 12/2017 | Phillips et al. |
| 2018/0011913 A1 | 1/2018 | Kapanipathi et al. |
| 2018/0027040 A1 | 1/2018 | Bae |
| 2018/0077109 A1 | 1/2018 | Hoeme et al. |
| 2018/0063193 A1* | 3/2018 | Chandrashekhar ... G06F 15/177 |
| 2018/0077110 A1 | 3/2018 | Huston, III et al. |
| 2018/0088993 A1 | 3/2018 | Gerdesmeier et al. |
| 2018/0101324 A1 | 4/2018 | Sharma |
| 2018/0173526 A1 | 6/2018 | Prinsloo et al. |
| 2018/0176615 A1 | 6/2018 | Hannu et al. |
| 2018/0191817 A1 | 6/2018 | Richardson et al. |
| 2018/0337885 A1 | 11/2018 | Singh et al. |
| 2019/0028562 A1 | 1/2019 | Watson et al. |
| 2019/0044787 A1 | 1/2019 | Richardson et al. |
| 2019/0044846 A1 | 2/2019 | Howard et al. |
| 2019/0052518 A1 | 2/2019 | Gal et al. |
| 2019/0074982 A1 | 3/2019 | Hughes |
| 2019/0089818 A1 | 3/2019 | Choi |
| 2019/0098109 A1 | 3/2019 | Watson |
| 2019/0121739 A1 | 4/2019 | Richardson et al. |
| 2019/0129908 A1 | 4/2019 | Kumarasamy |
| 2019/0140922 A1 | 5/2019 | Ellsworth et al. |
| 2019/0173941 A1 | 5/2019 | Puchala et al. |
| 2019/0173972 A1 | 6/2019 | MacCarthaigh et al. |
| 2019/0222666 A1 | 6/2019 | Uppal et al. |
| 2019/0297137 A1 | 9/2019 | Richardson et al. |
| 2019/0327510 A1 | 10/2019 | Kalagi et al. |
| 2020/0065132 A1 | 2/2020 | Mercier et al. |
| 2020/0084268 A1 | 3/2020 | Hollis et al. |
| 2020/0193234 A1 | 6/2020 | Pai et al. |
| 2020/0195677 A1 | 6/2020 | Uppal et al. |
| 2020/0195753 A1 | 6/2020 | Richardson et al. |
| 2020/0265096 A1 | 8/2020 | Raftery |
| 2020/0287817 A1 | 9/2020 | Howard et al. |
| 2020/0366638 A1 | 11/2020 | Vasquez et al. |
| 2020/0389534 A1 | 12/2020 | Sivasubramanian et al. |
| 2020/0389541 A1 | 12/2020 | Baldwin et al. |
| 2021/0021692 A1 | 1/2021 | Richardson et al. |
| 2021/0042163 A1 | 2/2021 | Radhakrishnan et al. |
| 2021/0119961 A1 | 4/2021 | Thunga et al. |
| 2021/0184958 A1 | 6/2021 | Kolar et al. |
| 2021/0194806 A1 | 6/2021 | Richardson et al. |
| 2021/0297365 A1 | 9/2021 | Richardson et al. |
| 2021/0367832 A1 | 11/2021 | Ramachandran et al. |
| 2022/0174010 A1 | 6/2022 | Richardson et al. |
| 2022/0224767 A1 | 7/2022 | Watson |
| 2022/0272146 A1 | 8/2022 | Richardson et al. |
| 2022/0407933 A1 | 12/2022 | Swaminathan |

FOREIGN PATENT DOCUMENTS

| | | |
|---|---|---|
| CN | 1422468 A | 6/2003 |
| CN | 1511399 A | 7/2004 |
| CN | 1605182 A | 4/2005 |
| CN | 101189598 A | 5/2008 |
| CN | 101431539 A | 5/2009 |
| CN | 101460907 A | 6/2009 |
| CN | 101631133 A | 1/2010 |
| CN | 103152357 A | 6/2013 |
| CN | 103731481 A | 4/2014 |
| CN | 104995935 A | 10/2015 |
| DE | 60318825 T2 | 1/2009 |
| EP | 1603307 A2 | 12/2005 |
| EP | 1351141 A2 | 10/2007 |
| EP | 2008167 A2 | 12/2008 |
| EP | 3156911 A1 | 4/2017 |
| JP | 07-141305 | 6/1995 |
| JP | 2001-0506093 | 5/2001 |
| JP | 2001-249907 | 9/2001 |
| JP | 2002-024192 | 1/2002 |
| JP | 2002-044137 | 2/2002 |
| JP | 2002-323986 | 11/2002 |

(56) References Cited

FOREIGN PATENT DOCUMENTS

| | | | |
|---|---|---|---|
| JP | 2003-167810 A | 6/2003 | |
| JP | 2003-167813 A | 6/2003 | |
| JP | 2003-188901 A | 7/2003 | |
| JP | 2003-522358 A | 7/2003 | |
| JP | 2004-070935 | 3/2004 | |
| JP | 2004-532471 | 10/2004 | |
| JP | 2004-533738 A | 11/2004 | |
| JP | 2005-537687 | 12/2005 | |
| JP | 3748216 B2 | 2/2006 | |
| JP | 2007-133896 A | 5/2007 | |
| JP | 2007-207225 A | 8/2007 | |
| JP | 2008-515106 A | 5/2008 | |
| JP | 2009-071538 A | 4/2009 | |
| JP | 2012-509623 | 4/2012 | |
| JP | 2012-209623 | 10/2012 | |
| WO | WO 2001/045349 A2 | 6/2001 | |
| WO | WO 2002/069608 A2 | 9/2002 | |
| WO | WO-2004006113 A1 * | 1/2004 | ........ H04L 29/06027 |
| WO | WO 2005/071560 A1 | 8/2005 | |
| WO | WO 2007/007960 A1 | 1/2007 | |
| WO | WO 2007/126837 A2 | 11/2007 | |
| WO | WO 2009124006 A2 | 10/2009 | |
| WO | WO 2010/002603 A1 | 1/2010 | |
| WO | WO 2012/044587 | 4/2012 | |
| WO | WO 2012065641 A1 | 5/2012 | |
| WO | WO 2014/047073 A1 | 3/2014 | |
| WO | WO-2015119606 A1 * | 8/2015 | ............. H04L 12/00 |
| WO | WO 2017/106455 A1 | 6/2017 | |
| WO | WO 2018/236597 A1 | 12/2018 | |

OTHER PUBLICATIONS

"Non-Final Office Action dated Jan. 3, 2012," U.S. Appl. No. 12/652,541; dated Jan. 3, 2012; 35 pages.
"Final Office Action dated Sep. 5, 2012," U.S. Appl. No. 12/652,541; dated Sep. 5, 2012; 40 pages.
"Notice of Allowance dated Jan. 4, 2013," U.S. Appl. No. 12/652,541; dated Jan. 4, 2013; 11 pages.
"Non-Final Office Action dated Apr. 30, 2014," U.S. Appl. No. 13/842,970; 20 pages.
"Final Office Action dated Aug. 19, 2014," U.S. Appl. No. 13/842,970; 13 pages.
"Notice of Allowance dated Dec. 5, 2014," U.S. Appl. No. 13/842,970; 6 pages.
Canonical Name (CNAME) DNS Records, domainavenue.com, Feb. 1, 2001, XP055153783, Retrieved from the Internet: URL:http://www.domainavenue.com/cname.htm [retrieved on Nov. 18, 2014].
"Content delivery network", Wikipedia, the free encyclopedia, Retrieved from the Internet: URL:http://en.wikipedia.org/w/index.php?title=Contentdeliverynetwork&oldid=601009970, XP055153445, Mar. 24, 2008.
"Global Server Load Balancing with ServerIron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (STRONGMAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSP ARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Softricity Desktop," Softricity, Inc., retrieved May 3, 2006, from http://www.softricity.com/products/, 3 pages.
"Xen—The Xen virtual Machine Monitor," University of Cambridge Computer Laboratory, retrieved Nov. 8, 2005, from http://www.cl.cam.ac.uk/Research/SRG/netos/xen/, 2 pages.
"XenFaq," retrieved Nov. 8, 2005, from http://wiki.xensource.com/xenwiki/XenFaq?action=print, 9 pages.
Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.
American Bar Association; Digital Signature Guidelines Tutorial [online]; Feb. 10, 2002 [retrieved on Mar. 2, 2010]; American Bar Association Section of Science and Technology Information Security Committee; Retrieved from the internet: (URL: http://web.archive.org/web/20020210124615/www.abanet.org/scitech/ec/isc/dsg-tutorial.html; pp. 1-8.
Arends et al., DNS Security Introduction and Requirements, RFC 4033, Mar. 2005, 21 pages.
Ariyapperuma et al., "Security Vulnerabilities in DNS and DNSSEC." The Second International Conference on Availability, Reliability and Security, IEEE, 2007, 8 pages.
Armour et al.: "A Heuristic Algorithm and Simulation Approach to Relative Location of Facilities"; Management Science, vol. 9, No. 2 (Jan. 1963); pp. 294-309.
Baglioni et al., "Preprocessing and Mining Web Log Data for Web Personalization", LNAI 2829, 2003, pp. 237-249.
Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).
Bellovin, S., "Distributed Firewalls,";login;:37-39, Nov. 1999, http://www.cs.columbia.edu/-smb/papers/distfw.html, 10 pages, retrieved Nov. 11, 2005.
Blaze, M., "Using the KeyNote Trust Management System," Mar. 1, 2001, from http://www.crypto.com/trustmgt/kn.html, 4 pages, retrieved May 17, 2006.
Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.
Byun et al., "A Dynamic Grid Services Deployment Mechanism for On-Demand Resource Provisioning", IEEE International Symposium on Cluster Computing and the Grid:863-870, 2005.
Chandramouli et al., "Challenges in Securing the Domain Name System." IEEE Security & Privacy4.1 (2006), pp. 84-87.
Chipara et al, "Realtime Power-Aware Routing in Sensor Network", IEEE, 2006, 10 pages.
Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.
Cohen et al., "Proactive Caching of DNS Records: Addressing a Performance Bottleneck", Proceedings of Saint 2001 Symposium on Applications and the Internet; 8-12, Jan. 8, 2001, IEEE Computer Society, pp. 85-94.
Coulson, D., "Network Security Iptables," Apr. 2003, Linuxpro, Part 2, retrieved from http://davidcoulson.net/writing/lxf/38/iptables.pdf, 4 pages.
Coulson, D., "Network Security Iptables," Mar. 2003, Linuxpro, Part 1, retrieved from http://davidcoulson.net/writing/lxf/39/iptables.pdf, 4 pages.
Deleuze, C., et al., A DNS Based Mapping Peering System for Peering CDNs, draft-deleuze-cdnp-dnsmap-peer-00.txt, Nov. 20, 2000, 20 pages.

(56) References Cited

OTHER PUBLICATIONS

Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.
Eastlake, Donald, Domain Name System Security Extensions, RFC 2535, Mar. 1999, 47 pages.
Frangoudis et al., "PTPv2-based network load estimation and its application to QoE monitoring for Over-the-Top services", IEEE, The 5th International conference on Information, Intelligence, Systems and Applications, IISA 2014, XP032629858, Jul. 7, 2014, pp. 176-181.
Gruener, J., "A Vision of Togetherness," May 24, 2004, NetworkWorld, retrieved May 3, 2006, from, http://www.networkworld.com/supp/2004/ndc3/0524virt.html, 9 pages.
Gunther et al, "Measuring Round Trip Times to determine the Distance between WLAN Nodes",May 2005, In Proc. of Networking 2005, all pages.
Gunther et al, "Measuring Round Trip Times to determine the Distance between WLAN Nodes", Dec. 18, 2004, Technical University Berlin, all pages.
Guo, F., Understanding Memory Resource Management in Vmware vSphere 5.0, Vmware, 2011, pp. 1-29.
Hameed, CC, "Disk Fragmentation and System Performance", Mar. 14, 2008, 3 pages.
Hartung et al., Digital rights management and watermarking of multimedia content for m-commerce applications; Published in: Communications Magazine, IEEE (vol. 38, Issue: 11 ); Date of Publication: Nov. 2000; pp. 78-84; IEEE Xplore.
Horvath et al., "Enhancing Energy Efficiency in Multi-tier Web Server Clusters via Prioritization," in Parallel and Distributed Processing Symposium, 2007. IPDPS 2007. IEEE International , vol., No., pp. 1-6, Mar. 26-30, 2007.
Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.
JH Software, Moving a DNS Server to a New IP Address, last updated Jan. 26, 2006, 1 page.
Joseph, Joshy, et al., "Introduction to Grid Computing," Apr. 16, 2004, retrieved Aug. 30, 2007, from http://www.informit.com/articles/printerfriendly.aspx?p=169508, 19 pages.
Kalafut et al., Understanding Implications of DNS Zone Provisioning., Proceeding IMC '08 Proceedings of the 8th AMC SIGCOMM conference on Internet measurement., pp. 211-216., ACM New York, NY, USA., 2008.
Kato, Yoshinobu , Server load balancer—Difference in distribution technique and supported protocol—Focus on function to meet the needs, Nikkei Communications, Japan, Nikkei Business Publications, Inc., Mar. 20, 2000, vol. 314, pp. 114 to 123.
Kenshi, P., "Help File Library: Iptables Basics," Justlinux, retrieved Dec. 1, 2005, from http://www.justlinux.com/nhf/Security/Iptables _ Basics.html, 4 pages.
Krsul et al., "VMPlants: Providing and Managing Virtual Machine Execution Environments for Grid Computing", Nov. 6, 2004 (Nov. 6, 2004), Supercomputing, 2004. Proceedings of the ACM/IEEE SC2004 Conference Pittsburgh, PA, USA Nov. 6-12, 2004, Piscataway, NJ, USA, IEEE, 1730 Massachusetts Ave., NW Washington, DC 20036-1992 USA, 12 pages.
Liu, "The Ultimate Guide to Preventing DNS-based DDoS Attacks", Retrieved from http://www.infoworld.com/article/2612835/security/the-ultimate-guide-to-preventing-dns-based-ddos-attacks.html, Published Oct. 30, 2013.
Liu et al., "Combined mining of Web server logs and web contents for classifying user navigation patterns and predicting users' future requests," Data & Knowledge Engineering 61 (2007) pp. 304-330.
Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.
Meng et al., "Improving the Scalability of Data Center Networks with Traffic-Aware Virtual Machine Placement"; Proceedings of the 29th Conference on Information Communications, INFOCOM'10, pp. 1154-1162. Piscataway, NJ. IEEE Press, 2010.
Mulligan et al.; How DRM-based content delivery systems disrupt expectations of "personal use"; Published in: Proceeding DRM '03 Proceedings of the 3rd ACM workshop on Digital rights management; 2003; pp. 77-89; ACM Digital Library.
Ragan, "Three Types of DNS Attacks and How to Deal with Them", Retrieved from http://www.csoonline.com/article/2133916/malware-cybercrime/three-types-of-dns-attacks-and-how-to-deal-with-them.html, Published Aug. 28, 2013.
Shankland, S., "Sun to buy start-up to bolster N1 ," Jul. 30, 2003, CNet News.com, retrieved May 3, 2006, http://news.zdnet.com/2100-3513_22-5057752.html, 8 pages.
Sharif et al, "Secure In-VM Monitoring Using Hardware Virtualization", Microsoft, Oct. 2009 http://research.microsoft.com/pubs/153179/sim-ccs09.pdf; 11 pages.
Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Takizawa, et al., "Scalable MultiReplication Framework on the Grid," Report of Study of Information Processing Society of Japan, Information Processing Society, vol. 2004, No. 81, pp. 247-252, Japan, Aug. 1, 2004.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Van Renesse, R., "Astrolabe: A Robust and Scalable Technology for Distributed System Monitoring, Management, and Data Mining," May 2003, ACM Transactions on Computer Systems (TOCS), 21 (2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814, 76159,00.html, 3 pages.
Virtual Iron Software Home, Virtual Iron, retrieved May 3, 2006, from http://www.virtualiron.com/, 1 page.
Waldspurger, CA., "Spawn: A Distributed Computational Economy," Feb. 1992, IEEE Transactions on Software Engineering, 18(2): 103-117, 15 pages.
Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.
Xu et al., "Decision tree regression for soft classification of remote sensing data", Remote Sensing of Environment 97 (2005) pp. 322-336.
Yamagata, et al., "A virtual-machine based fast deployment tool for Grid execution environment," Report of Study of Information Processing Society of Japan, Information Processing Society, vol. 2006, No. 20, pp. 127-132, Japan, Feb. 28, 2006.
Zaman et al., "Combinatorial Auction-Based Dynamic VM Provisioning and Allocation in Clouds", Department of Computer Science, Wayne State University, Sep. 2011 http://www.cs.wayne.edu/-dgrosu/pub/ccgrid12-symp.pdf.
Zhao et al., "Distributed file system support for virtual machines in grid computing", Jun. 4, 2004 (Jun. 4, 2004), High Performance Distributed Computing, 2004. Proceedings. 13th IEEE International Symposium on Honolulu, HI, USA Jun. 4-6, 2004, Piscataway, NJ, USA, IEEE, pp. 202-211.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.
Supplementary European Search Report in Application No. 09729072.0 2266064 dated Dec. 10, 2014.
Office Action in Application No. 09729072.0 dated May 14, 2018.
Office Action in Application No. 09729072.0 dated Dec. 7, 2018.
First Singapore Written Opinion in Application No. 201006836-9, dated Oct. 12, 2011 in 12 pages.

(56) References Cited

OTHER PUBLICATIONS

Singapore Written Opinion in Application No. 201006836-9, dated Apr. 30, 2012 in 10 pages.
First Office Action in Chinese Application No. 200980111422.3 dated Apr. 13, 2012.
First Office Action in Japanese Application No. 2011-502138 dated Feb. 1, 2013.
Singapore Written Opinion in Application No. 201006837-7, dated Oct. 12, 2011 in 11 pages.
Supplementary European Search Report in Application No. 09727694.3 dated Jan. 30, 2012 in 6 pages.
Singapore Examination Report in Application No. 201006837-7 dated Mar. 16, 2012.
First Office Action in Chinese Application No. 200980111426.1 dated Feb. 16, 2013.
Second Office Action in Chinese Application No. 200980111426.1 dated Dec. 25, 2013.
Third Office Action in Chinese Application No. 200980111426.1 dated Jul. 7, 2014.
Fourth Office Action in Chinese Application No. 200980111426.1 dated Jan. 15, 2015.
Fifth Office Action in Chinese Application No. 200980111426.1 dated Aug. 14, 2015.
First Office Action in Japanese Application No. 2011-502139 dated Nov. 5, 2013.
Decision of Rejection in Application No. 2011-502139 dated Jun. 30, 2014.
Office Action in Japanese Application No. 2011-502139 dated Aug. 17, 2015.
Office Action in Indian Application No. 5937/CHENP/2010 dated Jan. 19, 2018.
Singapore Written Opinion in Application No. 201006874-0, dated Oct. 12, 2011 in 10 pages.
First Office Action in Japanese Application No. 2011-502140 dated Dec. 7, 2012.
First Office Action in Chinese Application No. 200980119995.0 dated Jul. 6, 2012.
Second Office Action in Chinese Application No. 200980119995.0 dated Apr. 15, 2013.
Examination Report in Singapore Application No. 201006874-0 dated May 16, 2012.
Search Report in European Application No. 09839809.2 dated May 11, 2015.
Office Action in European Application No. 09839809.2 dated Dec. 8, 2016.
Office Action in Indian Application No. 6210/CHENP/2010 dated Mar. 27, 2018.
First Office Action in Chinese Application No. 200980119993.1 dated Jul. 4, 2012.
Second Office Action in Chinese Application No. 200980119993.1 dated Mar. 12, 2013.
Third Office Action in Chinese Application No. 200980119993.1 dated Oct. 21, 2013.
Supplementary European Search Report in Application No. 09728756.9 dated Jan. 8, 2013.
First Office Action in Japanese Application No. 2011-503091 dated Nov. 18, 2013.
Office Action in Japanese Application No. 2014-225580 dated Oct. 26, 2015.
Office Action in Japanese Application No. 2014-225580 dated Oct. 3, 2016.
Search Report and Written Opinion issued in Singapore Application No. 201006873-2 dated Oct. 12, 2011.
Examination Report in Indian Application No. 6213/CHENP/2010 dated May 23, 2018.
First Office Action is Chinese Application No. 200980125551.8 dated Jul. 4, 2012.
Second Office Action in Japanese Application No. 2011-516466 dated Mar. 17, 2014.
Decision of Refusal in Japanese Application No. 2011-516466 dated Jan. 16, 2015.
Office Action in Japanese Application No. 2011-516466 dated May 30, 2016.
Office Action in Japanese Application No. 2011-516466 dated Mar. 6, 2017.
Office Action in Canadian Application No. 2726915 dated May 13, 2013.
First Office Action in Korean Application No. 10-2011-7002461 dated May 29, 2013.
First Office Action in Chinese Application No. 200980145872.4 dated Nov. 29, 2012.
First Office Action in Canadian Application No. 2741895 dated Feb. 25, 2013.
Second Office Action in Canadian Application No. 2741895 dated Oct. 21, 2013.
Partial Supplementary Search Report in European Application No. 09826977.2 dated Oct. 4, 2016.
Extended Search Report in European Application No. 19184826.6 dated Jan. 17, 2020.
Search Report and Written Opinion in Singapore Application No. 201103333-9 dated Nov. 19, 2012.
Examination Report in Singapore Application No. 201103333-9 dated Aug. 13, 2013.
Office Action in Chinese Application No. 201310717573.1 dated Jul. 29, 2016.
Office Action in European Application No. 11767118.0 dated Feb. 3, 2017.
Office Action in European Application No. 11767118.0 dated Jul. 25, 2018.
Office Action in European Application No. 11767118.0 dated Jan. 29, 2019.
International Search Report and Written Opinion in PCT/US2011/053302 dated Nov. 28, 2011 in 11 pages.
International Preliminary Report on Patentability in PCT/US2011/053302 dated Apr. 2, 2013.
First Office Action in Japanese Application No. 2013-529454 dated Feb. 3, 2014 in 6 pages.
Office Action in Japanese Application No. 2013-529454 dated Mar. 9, 2015 in 8 pages.
First Office Action issued in Australian Application No. 2011307319 dated Mar. 6, 2014 in 5 pages.
Search Report and Written Opinion in Singapore Application No. 201301573-0 dated Jul. 1, 2014.
First Office Action in Chinese Application No. 201180046104.0 dated Nov. 3, 2014.
Second Office Action in Chinese Application No. 201180046104.0 dated Sep. 29, 2015.
Third Office Action in Chinese Application No. 201180046104.0 dated Apr. 14, 2016.
Decision of Rejection in Chinese Application No. 201180046104.0 dated Oct. 17, 2016.
Office Action in Chinese Application No. 201810426428.0 dated Jul. 20, 2020 in 25 pages.
Examination Report in Singapore Application No. 201301573-0 dated Dec. 22, 2014.
Examination Report in Indian Application No. 3105/DELNP/2013, dated Feb. 19, 2019.
International Preliminary Report on Patentability in PCT/US2011/061486 dated May 22, 2013.
International Search Report and Written Opinion in PCT/US2011/061486 dated Mar. 30, 2012 in 11 pages.
Office Action in Canadian Application No. 2816612 dated Nov. 3, 2015.
Office Action in Canadian Application No. 2816612 dated Oct. 7, 2016.
Office Action in Canadian Application No. 2816612 dated Aug. 8, 2017.
First Office Action in Chinese Application No. 201180053405.6 dated Feb. 10, 2015.
Second Office Action in Chinese Application No. 201180053405.6 dated Dec. 4, 2015.

(56) References Cited

OTHER PUBLICATIONS

Second Office Action in Chinese Application No. 201610828846.3 dated Aug. 5, 2020.
Office Action in Japanese Application No. 2013-540982 dated Jun. 2, 2014.
Written Opinion in Singapore Application No. 201303521-7 dated May 20, 2014.
Extended Search Report in European Application No. 18156163 dated Sep. 3, 2018.
Examination Report in Indian Application No. 4487/DELNP/2013 dated Dec. 28, 2018.
Office Action in Japanese Application No. 2015-533132 dated Apr. 25, 2016.
Office Action in Canadian Application No. 2884796 dated Apr. 28, 2016.
Office Action in Russian Application No. 2015114568 dated May 16, 2016.
Supplementary Examination Report in Singapore Application No. 11201501987U dated May 17, 2017.
Office Action in Chinese Application No. 2013800492635 dated Aug. 30, 2017.
Office Action in European Application No. 13770602.4 dated Mar. 11, 2019.
Office Action in Indian Application No. 2823/DELNP/2015 dated Oct. 25, 2019.
Office Action in Brazilian Application No. BR112015005588-5 dated Jan. 14, 2020.
International Search Report and Written Opinion in PCT/US07/07601 dated Jul. 18, 2008 in 11 pages.
International Preliminary Report on Patentability in PCT/US2007/007601 dated Sep. 30, 2008 in 8 pages.
Supplementary European Search Report in Application No. 07754164.7 dated Dec. 20, 2010 in 7 pages.
Office Action in Chinese Application No. 200780020255.2 dated Mar. 4, 2013.
Office Action in Chinese Application No. 201310537815.9 dated Feb. 1, 2018.
Office Action in Indian Application No. 3742/KOLNP/2008 dated Nov. 22, 2013.
Office Action in Japanese Application No. 2012-052264 dated Dec. 11, 2012 in 26 pages.
Office Action in Japanese Application No. 2013-123086 dated Apr. 15, 2014 in 3 pages.
Office Action in Japanese Application No. 2013-123086 dated Dec. 2, 2014 in 4 pages.
Office Action in Japanese Application No. 2015-075644 dated Apr. 5, 2016.
Office Action in European Application No. 07754164.7 dated Dec. 14, 2015.
Office Action in European Application No. 07754164.7 dated Jan. 25, 2018.
Office Action in Chinese Application No. 201310537815.9 dated Jul. 5, 2016.
Office Action in Chinese Application No. 201310537815.9 dated Jun. 2, 2017.
International Search Report and Written Opinion in PCT/US/2016/066848 dated May 1, 2017.
International Preliminary Report on Patentability in PCT/US/2016/066848 dated Jun. 19, 2018.
Extended European Search Report in Application No. 16876655.8 dated Aug. 20, 2019.
Partial Search Report in European Application No. 16876655.8 dated May 15, 2019.
International Search Report and Written Opinion in PCT/US2017/055156 dated Dec. 13, 2017.
International Preliminary Report on Patentability and Written Opinion in PCT/US2017/055156 dated Apr. 9, 2019.
International Search Report and Written Opinion in PCT/US2018/036634 dated Sep. 11, 2018.
International Preliminary Report on Patentability and Written Opinion in PCT/US2018/036634 dated Dec. 24, 2019.
Office Action issued in connection with European Patent Application No. 18734734 dated Oct. 19, 2020.
First Office Action in Chinese Applicaton No. 201610112984.1 dated Mar. 20, 2018.
Second Office Action in Chinese Applicaton No. 201610112984.1 dated Feb. 2, 2019.
Examination Report in Indian Application No. 201918034730 dated Mar. 9, 2022 in 7 pages.
Supplementary Examination Report in Singapore Application No. 10201705920S dated Dec. 24, 2021.
Communication regarding the expiry of the time limit within which notice of opposition may be filed in Application No. 16876655.8 dated Jun. 29, 2022.

\* cited by examiner

ORIGIN SERVER CLOAKING USING VIRTUAL PRIVATE CLOUD NETWORK ENVIRONMENTS

CROSS-REFERENCE TO RELATED APPLICATIONS

This application is a continuation of U.S. patent application Ser. No. 15/419,880, entitled "ORIGIN SERVER CLOAKING USING VIRTUAL PRIVATE CLOUD NETWORK ENVIRONMENTS" and filed on Jan. 30, 2017, which is hereby incorporated by reference herein in its entirety.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete or otherwise manage virtual machines in a dynamic matter. In turn, users can request computer resources from a data center, including single computing devices or a configuration of networked computing devices, and be provided with varying numbers of virtual machine resources.

Generally, physical networks include a number of hardware devices that receive packets from a source network component and forward the packets to designated recipient network components. In physical networks, packet routing hardware devices are typically referred to as routers, which are implemented on stand-alone computing devices connected to a physical network. With the advent of virtualization technologies, networks and routing for those networks can now be simulated using commodity computing devices rather than actual routers.

Virtualized networks provide advantages over traditional networks, in that the can be rapidly created, configured, or destroyed without reconfiguring underlying physical hardware devices. However, they can also add a layer of complexity over traditional systems. For example, virtualized systems may not have direct physical addresses, as traditional systems would, making transmission of communications between virtualized systems more difficult. Moreover, at least some virtualized systems may be configured to be private, such that public network addressing schemes, which otherwise serve to enable communications between virtualized systems, are not directly usable to communicate between virtualized systems. Thus, existing functionalities and practices may not be directly usable on virtualized systems.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
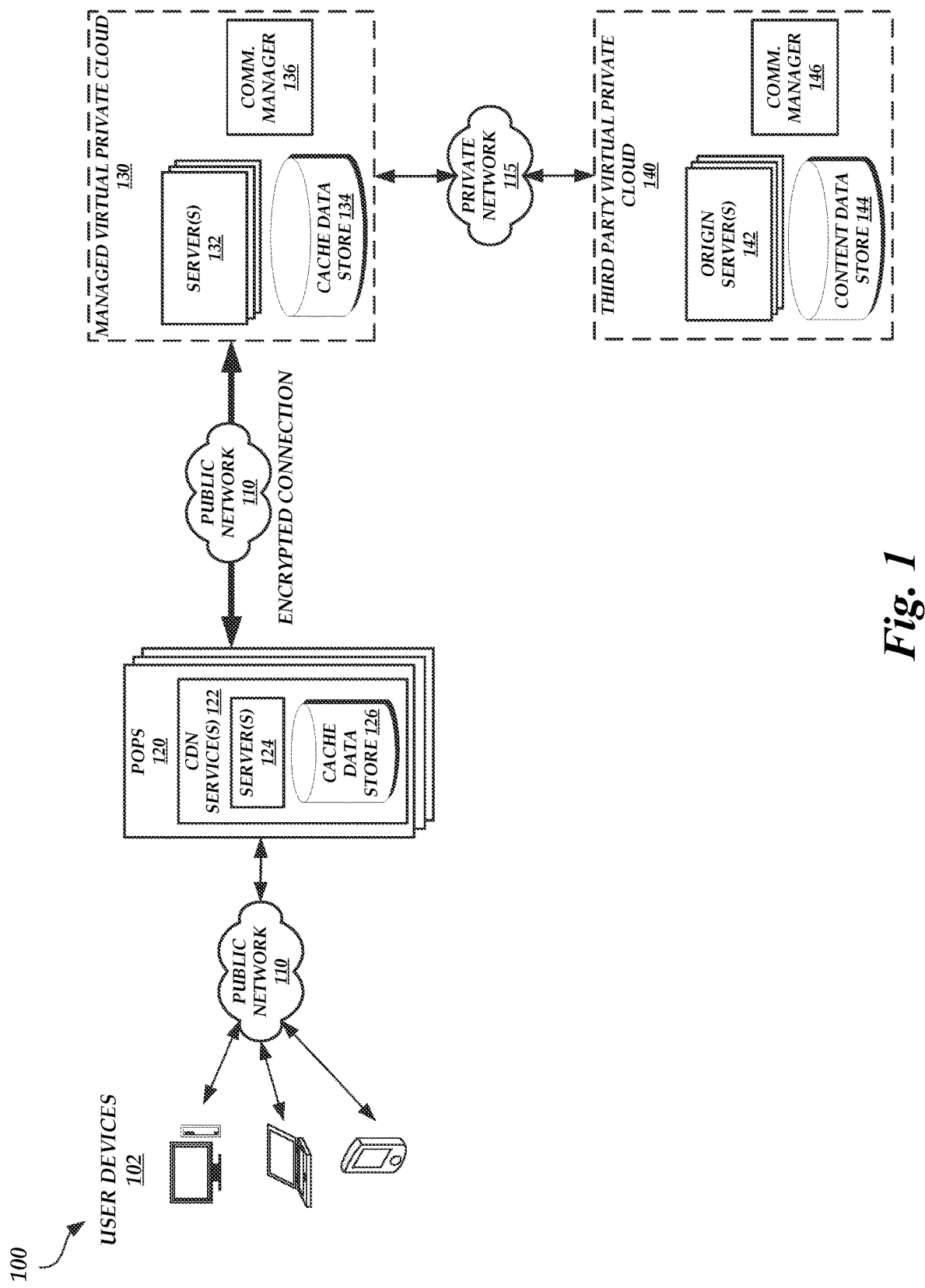
FIG. 1 is a block diagram of an illustrative operating environment in which one or more origin servers are implemented in physical computing devices or in virtual machine instances hosted by physical computing devices within a third party VPC.

Generally described, the present disclosure relates to providing an origin server within a virtual private cloud network environment that can service a content delivery network accessible via a public network, without requiring the origin server or the virtual private cloud network to be publically or externally addressable. The term "virtual private cloud network environment" (sometimes shortened to "virtual private cloud" or simply "VPC") generally refers to a virtualized network environment, in which a collection of computing devices is enabled, for example, by a substrate network, to communicate, including for example as if the collection of computing devices existed within a local area network (LAN) environment. Accordingly, the devices within a VPC may often share a common subnet, and (from the perspective of the devices) directly communicate with one another without the use of complex routing protocols. However, unlike traditional LANs, the devices within a VPC need not share a direct physical interconnection. Instead, the devices may be located in geographically diverse regions, and in some instances may themselves be virtual devices (e.g., virtual machines). A substrate (e.g., physical) network may encapsulate or otherwise alter communications from devices associated with the VPC to create the illusion, from the point of view of devices within the VPC, that a LAN environment exists. VPCs provide many advantages over traditional LANs, in that the configuration of computing devices can be changed dynamically, via software, without changing a physical configuration of devices. Moreover, VPCs maintain many benefits of traditional LANs in that communications between the computing devices are relatively simple and secure. A single data center may include sufficient hardware to implement multiple VPCs, each of which may be isolated from each other (e.g., each VPC may include a separate substrate network). Additional details of the components included in VPCs and the techniques used to implement VPCs are described in U.S. patent application Ser. No. 15/245,089, entitled "EXTERNAL HEALTH CHECKING OF VIRTUAL PRIVATE CLOUD NETWORK ENVIRONMENTS" and filed on Aug. 23, 2016, which is hereby incorporated herein by reference in its entirety.

Origin servers may store primary versions of content for distribution to various user devices. For example, origin servers typically use publicly routable addresses (e.g., Internet protocol (IP) addresses) to provide content to content delivery networks (CDNs), which then distribute such content to various user devices. Because the origin servers are publicly accessible, the content stored therein is exposed and can be subject to unauthorized access. One way to mitigate this danger may be to set up a whitelist of known CDN IP addresses such that only those IP addresses included in the whitelist, and therefore only certain CDNs, can access the origin server. However, this is not a complete solution. If the whitelist is out of sync (e.g., because a CDN changed IP addresses, a new CDN has been introduced into service, etc.), then some CDNs may not be able to access the origin server. A user device may then receive an error when requesting content through certain CDNs. An administrator may have to manually reconfigure the origin server and periodically update the whitelist to allow all desired CDNs to access the origin server. In fact, even with a whitelist, an origin server may still be vulnerable to direct volumetric attacks. For example, a high volume distributed denial of service (DDoS) attack may still result in broad throttling of all traffic directed to and originating from the origin server.

An origin server could be implemented by a computing device within a VPC (e.g., a physical computing device, a virtual computing device, etc.) such that the origin server is accessible by devices within the VPC that share a common subnet. However, like traditional LANs, communications into a VPC from an external source (e.g., a publically addressed server) generally required the VPC to be at least in part publically addressable, and to have a computing device open to communications from a public space. This situation can be disadvantageous in that it can reduce the security of the VPC.

To address these issues, the present disclosure provides an origin server that is implemented within one or more devices within a VPC. The VPC may be managed by a third party, such as the entity that operates the origin server and/or owns the primary content distributed by the origin server. However, instead of communicating with various CDNs over a public network, the third party VPC may instead communicate with a managed VPC via a private network. As an example, the managed VPC may be owned and/or operated by the same entity as the entity that owns and/or operates one or more CDNs. Thus, no gateway, network address translation (NAT), or other such devices may be needed for the third party VPC and the managed VPC to communicate. Rather, a VPC identifier of the managed VPC and a VPC identifier of the third party VPC are used to pair the two VPCs. Once paired, a private route is then set up in the third party VPC that points to the private address space of the managed VPC. When a packet is generated by the third party VPC for transmission along the private route to the managed VPC, the third party VPC may encapsulate the packet with a header that points to the location of the managed VPC. Similarly, when a packet is generated by the managed VPC for transmission along the private route to the third party VPC, the managed VPC may encapsulate the packet with a header that points to the location of the third party VPC. Once the encapsulated packet is received, the managed VPC or the third party VPC may decapsulate the encapsulated packet and extract data (e.g., primary content stored by the origin server, a request for a file, etc.). Thus, to the managed VPC, the packet appears as if it originated from the third party VPC's private address space, and to the third party VPC, the packet appears as if it originated from the managed VPC's private address space. Optionally, the managed VPC and the third party VPC may communicate over a public network. The origin server may still not be publicly addressable, however, because the encapsulation techniques described herein may ensure that malicious or unauthorized systems cannot spoof, for example, a request for a file in an attempt to access the origin server.

The managed VPC can communicate with one or more CDNs to provide requested content retrieved from the third party VPC. Because the managed VPC communicates with one or more CDNs, the managed VPC is publicly addressable. However, the connection between a CDN and the managed VPC may be encrypted and pass through private infrastructure (e.g., routers, gateways, and/or other routing systems that are owned and/or operated by an entity that owns and/or operates the CDN and the managed VPC). Thus, the managed VPC may benefit from a higher level of protection than typical publically addressable systems.

As an illustrative example, a user device may request a file, such as a resource (e.g., a script, an image, video, audio, etc.), webpage content, etc. located at a URL, from a CDN. The CDN may include a cache in which certain files are stored (e.g., the most-frequently requested files). The CDN may query the cache to determine whether the requested file is stored therein. If the requested file is present, the CDN can return the file to satisfy the request. Otherwise, the CDN can transmit a request to the managed VPC for the file. The managed VPC may optionally include a cache in which certain files are stored. If the managed VPC includes a cache, the cache in the managed VPC may have a larger capacity than the cache in the CDN and may be referred to herein as a "mid-tier cache." Thus, the mid-tier cache may serve as a potential intermediary source of content for CDNs, such that when a cache miss occurs at the CDN, the requested content can be retrieved from a mid-tier cache rather than the origin server that stores the primary copy of the content. If the managed VPC includes a mid-tier cache, the managed VPC can query the mid-tier cache to determine whether the requested file is stored therein. If the requested file is present, the managed VPC can transmit the requested file to the CDN via the private infrastructure and the CDN can forward the file to the user device. Otherwise, if the requested file is not present in the mid-tier cache or if the managed VPC does not include a mid-tier cache, the managed VPC can transmit a request for the file to the third party VPC via the private route established between the managed VPC and the third party VPC. The managed VPC (e.g., a communication manager in the managed VPC) can encapsulate the request with a header that points to a location of the third party VPC such that the encapsulated request is routed via the private route to the third party VPC. The third party VPC can decapsulate the encapsulated request, an origin server in the third party VPC can retrieve the file from a content data store in the third party VPC, and the origin server can generate a packet for transmitting the file to the managed VPC. Before transmission occurs, the third party VPC (e.g., a communication manager in the third party VPC) may encapsulate the packet with a header that points to a location of the managed VPC such that the encapsulated packet is routed via the private route to the managed VPC. The managed VPC receives the encapsulated packet, decapsulates the encapsulated packet, and extracts the file in the packet for transmission to the CDN. The CDN can then distribute the file to the user device to complete the request.

As will be appreciated by one of skill in the art in light of the present disclosure, the embodiments disclosed herein improves the ability of computing systems, such as those implementing virtual private cloud network environments, to service user requests for content without comprising the security of the origin server that manages the primary copy of the content. Specifically, aspects of the present disclosure enable origin servers to be included within a virtual private cloud network environment such that the origin servers are not publically addressable while still allowing the origin servers to provide content to CDNs for distribution to user devices. Moreover, the presently disclosed embodiments address technical problems inherent within computing systems; specifically, the expected exhaustion of IPv4 addresses. Because of IPv4 address exhaustion, numerous systems are transitioning to the use of IPv6 addresses. This transition can be burdensome and costly, as entire systems may receive new public addresses and may need to be reconfigured so that they can continue to communicate with one another using the new addresses. Because the origin server is embedded within a virtual private cloud network environment such that the origin server is not publicly addressable, no IPv4 or IPv6 address needs to be assigned to the origin server or VPC and therefore future version updates to IP will not affect the implementation or operation of the origin servers described herein. Thus, the present disclosure represents an improvement on existing virtual network systems and computing systems in general.

The foregoing aspects and many of the attendant advantages of this disclosure will become more readily appreciated as the same become better understood by reference to the following detailed description, when taken in conjunction with the accompanying drawings.

Example Origin Server Cloaking Environment

FIG. 1 is a block diagram of an illustrative operating environment 100 in which one or more origin servers 142 are implemented in physical computing devices or in virtual machine instances hosted by physical computing devices within a third party VPC 140. The operating environment 100 further includes one or more points of presence (POPs) 120 and a managed VPC 130.

As used herein, a POP is intended to refer to any collection of related computing devices utilized to implement functionality on behalf of one or many providers. POPs are generally associated with a specific geographic location in which the computing devices implementing the POP are located, or with a region serviced by the POP. For example, a data center or a collection of computing devices within a data center may form a POP. In some instances, the POPs may implement one or more services, such as CDN services, data storage services, data processing services, etc. For the purposes of the present disclosure, the POPs 120 implement CDN service(s) 122. The CDN service(s) 122 can include one or more servers 124 communicatively coupled to a cache data store 126. The server 124 and cache data store 126 may operate in conjunction to implement functionalities of the CDN service(s) 122. For example, the server 124 and cache data store 126 may operate to cache distributed content (e.g., as provided by the one or more origin servers 142) and respond to requests from end users (e.g., via user devices 102) for such cached content.

The managed VPC 130 and the third party VPC 140 may each represent private virtualized networks implemented by a substrate network. The managed VPC 130 includes, for example, one or more servers 132, an optional cache data store 134, and a communication manager 136. The servers 132 may generally provide any network-accessible functionality, such as web page hosting or database hosting, among many others known in the art. For example, the servers 132 and cache data store 134 may operate to cache distributed content (e.g., as provided by the one or more origin servers 142) and respond to requests from CDNs (e.g., POPs 120) for such cached content. The cache data store 134 may have a larger capacity than the cache data store 126 and therefore may be a mid-tier cache. Thus, the cache data store 134 may serve as a potential intermediary source of content for POPs 120, such that when a cache miss occurs at a POP 120, the requested content can be retrieved from the cache data store 134 rather than the origin server 142 that stores the primary copy of the content. In situations in which the managed VPC 130 does not include a cache data store 134, the servers 132 may operate to respond to requests from CDN service(s) 122 for content by forwarding such requests to the third party VPC 140. Thus, the servers 132 may not parse requests received from the CDN service(s) 122 and may merely encapsulate the request (e.g., reroute the request) for transmission to the third party VPC 140, as described in greater detail below.

The communication manager 136 can configure, authorize, and/or otherwise manage communications internal to the managed VPC 130 and/or between the managed VPC 130 and other computing systems, such as the third party VPC 140. For example, the communication manager 136 can provide logical networking functionality for one or more virtual computer networks that are provided within the managed VPC 130. The communication manager 136 may configure communications between computing nodes in the managed VPC 130 so as to overlay a virtual network over one or more intermediate physical networks that are used as a substrate network. As an illustrative example, the communication manager 136 can manage communications between the servers 132 and the cache data store 134, if present. As another example, the communication manager 136 can encapsulate any packets generated by the one or more servers 132 for transmissions external to the managed VPC 130 and decapsulate encapsulated packets received from VPCs external to the managed VPC 130. As an illustrative example, the communication manager 136 can encapsulate requests for content generated by the one or more servers 132 for transmission to the third party VPC 140. Once the request is encapsulated, the communication manager 136 can transmit the encapsulated request over the private network 115 (or the public network 110) to the third party VPC 140. The communication manager 136 can also receive encapsulated packets from the third party VPC 140, where the encapsulated packets include requested file(s). The communication manager 136 can decapsulate the encapsulated packets and forward the contents to the one or more servers 132. In other embodiments, not shown, the communication manager 136 is located in the CDN service(s) 122 and performs the same operations described herein.

The third party VPC 140 includes, for example, the one or more origin servers 142, a content data store 144, and a communication manager 146. The origin servers 142 may provide one or more sets of content ("distributions") to a CDN (e.g., CDN service(s) 122) for subsequent transmission to user devices 102. For example, origin servers 142 may include servers hosting web sites, streaming audio, video, or multimedia services, data analytics services, or other network-accessible services. The content data store 144 may store primary versions of content within various distributions. The one or more origin servers 142 may retrieve a primary copy of content that is stored in the content data store 144 for distribution to the user devices 102 via the POP 120 and the managed VPC 130 at the request of the managed VPC 130 (e.g., when a cache miss occurs at the managed VPC 130).

The communication manager 146 can configure, authorize, and/or otherwise manage communications internal to the third party VPC 140 and/or between the third party VPC 140 and other computing systems, such as the managed VPC 130. For example, the communication manager 146 can provide logical networking functionality for one or more virtual computer networks that are provided within the third party VPC 140. The communication manager 146 may configure communications between computing nodes in the third party VPC 140 so as to overlay a virtual network over one or more intermediate physical networks that are used as a substrate network. As an illustrative example, the communication manager 146 can manage communications between the origin servers 142 and the content data store 144. As another example, the communication manager 146 can encapsulate any packets generated by the one or more origin servers 142 for transmissions external to the third party VPC 140 and decapsulate encapsulated packets received from VPCs external to the third party VPC 140. As an illustrative example, the communication manager 146 can encapsulate packets that include requested files generated by the one or more origin servers 142 for transmission to the managed VPC 130. Once the packet is encapsulated, the communication manager 146 can transmit the encapsulated packet over the private network 115 (or the public network 110) to the managed VPC 130. The communication manager 146 can also receive encapsulated requests for content from the managed VPC 130. The communication manager 146 can decapsulate the encapsulated requests and forward the requests to the one or more origin servers 142.

The servers 132 and/or the origin servers 142 may be implemented, for example, in one or more physical computing devices of a substrate network and/or as virtual machines hosted by physical computing devices of a substrate network. Furthermore, the cache data store 134 and/or the content data store 144 may be implemented, for example, in one or more physical computing devices of a substrate network and/or as virtual machines hosted by physical computing devices of a substrate network. The communication manager 136 may be implemented, for example, in one or more physical computing devices or in one or more virtual machines hosted by physical computing devices that are in communication with the servers 132 via the substrate network. Likewise, the communication manager 146 may be implemented, for example, in one or more physical computing devices or in one or more virtual machines hosted by physical computing devices that are in communication with the origin servers 142 via the substrate network.

The third party VPC 140 may be managed by a third party, such as the entity that operates the origin server 142 and/or owns the primary content distributed by the origin server 142. As illustrated in FIG. 1, instead of communicating with a POP 120 over a public network 110, the third party VPC 140 may instead communicate with the managed VPC 130 via a private network 115. In other embodiments, not shown, the third party VPC 140 communicates with the managed VPC 130 via the public network 110, but the origin servers 142 implemented by the third party VPC 140 are still not publicly addressable or accessible. The public network 110 can be a publicly accessible network of networks, such as the Internet, and the private network 115 can be an organization's network that is wholly or partially inaccessible from computing systems external to the private network 115. Thus, because the third party VPC 140 and the managed VPC 130 communicate via the private network 115, no gateway, network address translation (NAT), or other such devices may be needed for the third party VPC 140 and the managed VPC 130 to communicate.

To establish the private network 115 connection, the managed VPC 130 and the third party VPC 140 are paired using a VPC identifier of the managed VPC 130 and a VPC identifier of the third party VPC 140. For example, a network-based portal may allow an entity that operates the third party VPC 140 to manage the third party VPC 140. The network-based portal may offer an option to the entity to cloak an origin server (e.g., reconfigure the network routing to an origin server such that the origin server is no longer publicly addressable). Upon a selection of the option to cloak an origin server, a communication manager (not shown) or other such physical computing device can identify the VPC identifier of a managed VPC that resides in the same geographic location as the third party VPC 140 (e.g., the managed VPC 130 in this case) and create a private route between the third party VPC 140 and the managed VPC that resides in the same geographic location as the third party VPC 140 using the respective VPC identifiers. Alternatively, upon a selection of the option to cloak an origin server, a communication manager (e.g., communication manager 136, communication manager 146, etc.) or other such physical computing device can identify the VPC identifier of a managed VPC that resides in a geographic location selected or authorized by the entity to serve as a region in which the origin server 142 can communicate. The communication manager or other such physical computing device can then create a private route between the third party VPC 140 and the managed VPC using the respective VPC identifiers. In an embodiment, the communication manager or other such physical computing device is located within the same data center as the third party VPC 140 (e.g., the communication manager 146 is located within the third party VPC 140).

The VPC identifiers of the managed VPC 130 and the third party VPC 140 may be associated with their respective private address space, and thus the private route may point from the private address space of the third party VPC 140 to the private address space of the managed VPC 130. When a packet is generated by the origin server 142 in the third party VPC 140 for transmission along the private route to the server 132 in the managed VPC 130, the third party VPC 140 (e.g., the communication manager 146) may encapsulate the packet with a header that points to the location of the managed VPC 130. For example, the private route may be represented with a virtual IP address and the third party VPC 140 may store information that maps the virtual IP address to a location and/or a VPC identifier of the managed VPC 130 (e.g., where the VPC identifier corresponds with a location of the managed VPC 130). The communication manager 146 can receive the generated packet from the origin server 142, encapsulate the packet with the header that points to the location of the managed VPC 130, and forward the encapsulated packet to the managed VPC 130 (e.g., the communication manager 136). Once the encapsulated packet is received by the communication manager 136, the communication manager 136 may decapsulate the encapsulated packet, extract data from the data portion of the packet (e.g., a file retrieved from the content data store 144), and forward the extracted data (or the decapsulated packet) to the server 132. Thus, to the server 132, the packet appears as if it originated from the private address space of the third party VPC 140. The server 132 and the communication manager 136 may follow a similar process as the origin server 142 and the communication manager 146 to transmit packets to the third party VPC 140 (e.g., packets that, for example, include a request for content from the content data store 144) and the origin server 142 and the communication manager 146 may follow a similar process as the server 132 and the communication manager 136 to process received packets.

In an embodiment, the managed VPC 130 and the third party VPC 140 are implemented by physical computing devices located with the same data center in a specific geographic location. In other embodiments, the managed VPC 130 and the third party VPC 140 are implemented by physical computing devices located in different data centers in different geographic locations.

The managed VPC 130 can communicate with one or more POPs 120 to provide requested content retrieved from the third party VPC 140 via the public network 110. Accordingly, the managed VPC 130 is publicly addressable. Typically, because the managed VPC 130 is publicly addressable, the managed VPC 130 could be subject to the same issues described above with respect to publicly addressable systems. However, the managed VPC 130 may be owned and/or operated by the same entity as the entity that owns and/or operates the POPs 120. Thus, in some embodiments, the connection between a POP 120 and the managed VPC 130 may be encrypted and pass through private infrastructure (e.g., routers, gateways, and/or other routing systems that are owned and/or operated by an entity that owns and/or operates the POP 120 and the managed VPC 130).

The user devices 102 may communicate with the POPs 120 via the public network 110. For example, a user device 102 may send a request for content (e.g., a specific file) to a POP 120 and receive the requested content from the POP 120 in response to the request. Accordingly, a user device 102 requests content from a POP 120 via the public network 110, the POP 120 requests content from the managed VPC 130 via an encrypted connection that passes through private infrastructure in the public network 110, and the managed VPC 130 requests content from the third party VPC 140 via the private network 115. Additional details on the transmission of messages between each of these components are provided below with respect to FIG. 2.

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The user devices 102 may execute an application (e.g., a browser, a media player, etc.) that generates and transmits a request for content to a POP 120.

The public network 110 may include any wired network, wireless network, or combination thereof. For example, the public network 110 may be a personal area network, local area network, wide area network, over-the-air broadcast network (e.g., for radio or television), cable network, satellite network, cellular telephone network, or combination thereof. As a further example, the public network 110 may be a publicly accessible network of linked networks, possibly operated by various distinct parties, such as the Internet. In some embodiments, the public network 110 may be a semi-private network, such as a corporate or university intranet. The public network 110 may include one or more wireless networks, such as a Global System for Mobile Communications (GSM) network, a Code Division Multiple Access (CDMA) network, a Long Term Evolution (LTE) network, or any other type of wireless network. The public network 110 can use protocols and components for communicating via the Internet or any of the other aforementioned types of networks. For example, the protocols used by the public network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein. Similarly, the private network 115 may use any of the protocols described above.

Example Block Diagram for Requesting Content

Figure 2:
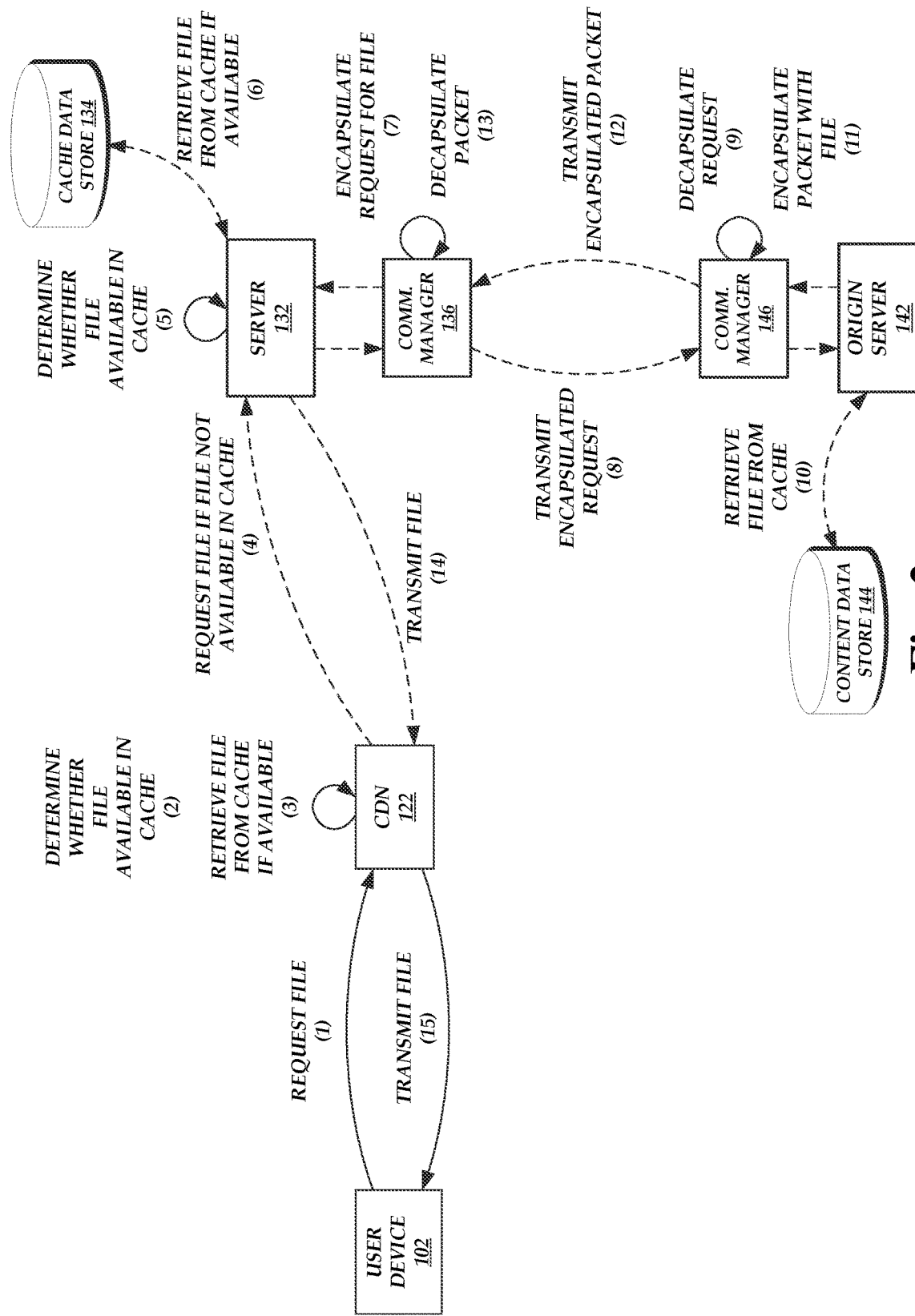
FIG. 2 is a block diagram of the operating environment of FIG. 1 illustrating the operations performed by the components of the operating environment to request content, according to one embodiment.

FIG. 2 is a block diagram of the operating environment 100 of FIG. 1 illustrating the operations performed by the components of the operating environment 100 to request content, according to one embodiment. As illustrated in FIG. 2, a user device may request a file from a CDN 122 at (1). The CDN 122 may include a cache (e.g., the cache data store 126) in which certain files are stored (e.g., the most-frequently requested files). The CDN 122 may query the cache to determine whether the requested file is available at (2). If the requested file is available in the cache, the CDN 122 can retrieve the file from the cache at (3). Otherwise, if the file is not available in the CDN 122 cache, the CDN 122 can transmit a request for the file to the server 132 in the managed VPC 130 at (4). The request may be transmitted over the public network 110, but using private infrastructure.

As described above, the managed VPC 130 optionally includes a cache (e.g., the cache data store 134). If the cache data store 134 is present, the server 132 can query the cache data store 134 to determine whether the requested file is stored therein at (5). If the requested file is available, the server 132 can retrieve the file from the cache data store 134 at (6). Otherwise, if the requested file is not available in the cache data store 134 or if the cache data store 134 is not present in the managed VPC 130 (e.g., the managed VPC 130 does not serve as a mid-tier cache), the server 132 can generate a request for the file for sending to the origin server 142 (e.g., the request for the file generated by the server 132 can include a virtual address of the origin server 142 as a destination address). The communication manager 136 can intercept the generated request and encapsulate the request with a header that points to a location of the third party VPC 140 at (7) (e.g., the header includes the location of the third party VPC 140 as a destination address). The communication manager 136 then transmits the encapsulated request to the third party VPC 140 at (8). The encapsulated request may be transmitted via the private route established between the managed VPC 130 and the third party VPC 140 via the private network 115.

The communication manager 146 can intercept the encapsulated request before it reaches the origin server 142. The communication manager 146 can decapsulate the encapsulated request at (9) and forward the decapsulated request to the origin server 142 (e.g., based on the virtual address included in the original request generated by the server 132). Based on the received request, the origin server 142 in the third party VPC 140 can retrieve the file from the content data store 144 at (10). The origin server 142 can then generate a packet that includes the retrieved file in the data portion of the packet for transmission to the server 132 (e.g., the packet generated by the origin server 142 can include a virtual address of the server 132 as a destination address). The communication manager 146 can intercept the generated packet and encapsulate the packet with a header that points to a location of the managed VPC 130 at (11) (e.g., the header includes the location of the managed VPC 130 as a destination address). The packet may be encapsulated such that the encapsulated packet is routed via the private route to the managed VPC 130. The communication manager 146 then transmits the encapsulated packet to the managed VPC 130 at (12).

The communication manager 136 can intercept the encapsulated packet before it reaches the server 132. The communication manager 136 can decapsulate the encapsulated packet at (13) and forward the decapsulated packet to the server 132 (e.g., based on the virtual address included in the original packet generated by the origin server 142). Based on the received packet, the server 132 can then extract the file from the data portion of the packet and transmit the file to the CDN 122 at (14) via the private infrastructure in the public network 110. The CDN 122 can then transmit the file to the user device 102 at (15) via the public network 110 to satisfy the file request. Optionally, the server 132 can store the retrieved file in the cache data store 134, if present, such that the managed VPC can serve a future request for the file by retrieving the file from the cache data store 134 rather than the third party VPC 140.

Figure 3:
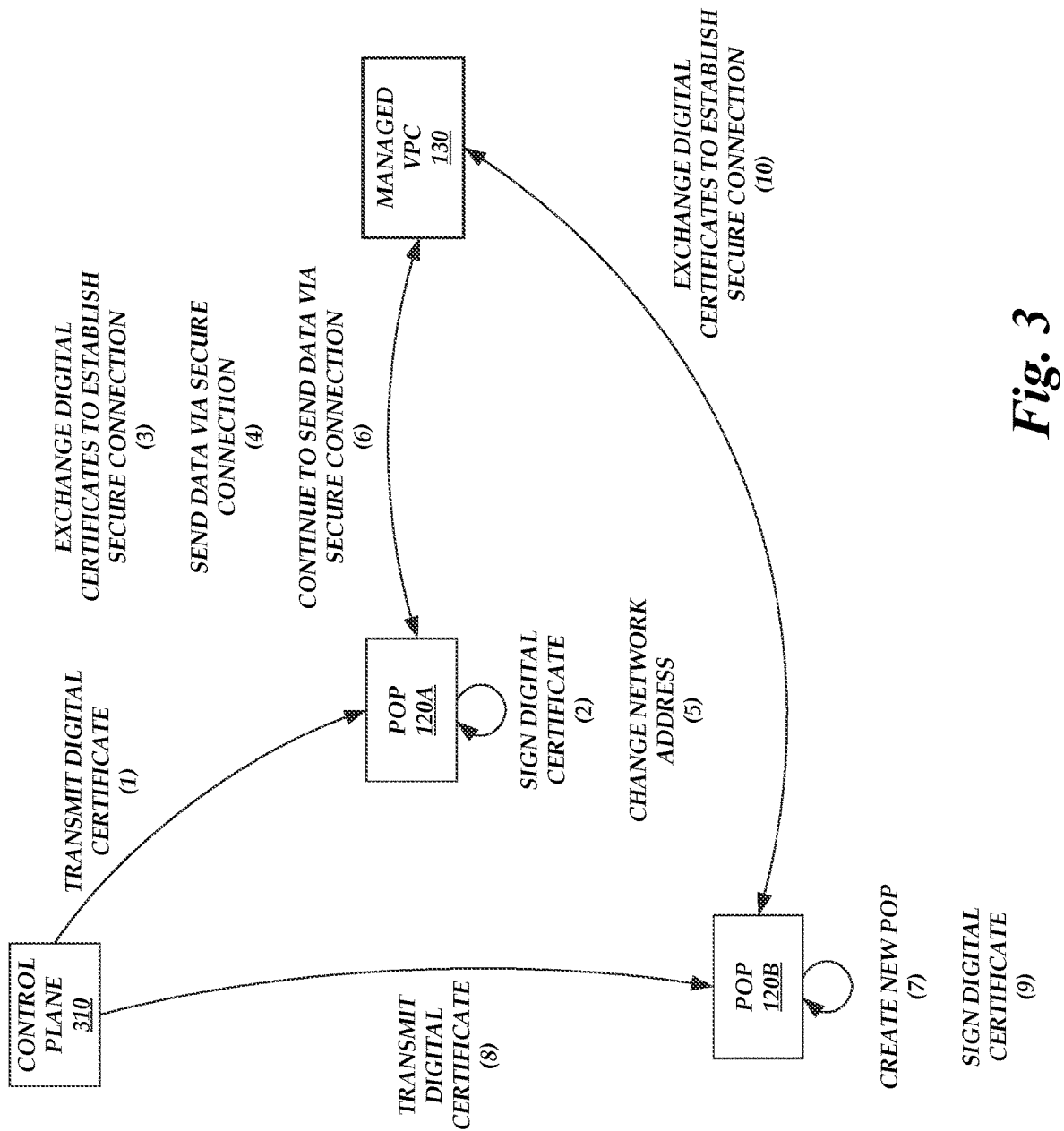
FIG. 3 is a block diagram of the operating environment of FIG. 1 illustrating the operations performed by the components of the operating environment to establish a secure connection between a POP and the managed VPC, according to one embodiment.

Example Block Diagram for Establishing Secure Connection Between POP and Managed VPC FIG. 3 is a block diagram of the operating environment 100 of FIG. 1 illustrating the operations performed by the components of the operating environment 100 to establish a secure connection between a POP 120 and the managed VPC 130, according to one embodiment. As illustrated in FIG. 3, a control plane 310 transmits a digital certificate to a POP 120A at (1). The control plane 310 may be a physical computing device present in a data center or other location in which one or more POPs 120 reside. The control plane 310 may manage digital certificate rotation, among other tasks. For example, the control plane 310 may automatically distribute a digital certificate to a new POP 120, updated digital certificates to existing POPs 120, digital certificates to managed VPCs 130, and/or the like.

Upon receipt of the digital certificate, the POP 120A signs the digital certificate at (2). The managed VPC 130 may already have a signed digital certificate. Thus, the POP 120A and the managed VPC 130 may exchange their respective signed digital certificates to establish a secure connection at (3). For example, the secure connection may be a secure sockets layer (SSL) or transport layer security (TLS) connection. Because both the POP 120A and the managed VPC 130 have their own digital certificate, the POP 120A can trust the managed VPC 130 based on the digital certificate of the managed VPC 130 and the VPC 130 can trust the POP 120A based on the digital certificate of the POP 120A.

Once the secure connection is established, the POP 120A and the managed VPC 130 can transmit data to each other via the secure connection at (4). For example, when the POP 120A transmits data to the managed VPC 130, the POP 120A may use the public key provided in the digital certificate of the managed VPC 130 to encrypt the transmitted data. The VPC 130 can then decrypt the data using its private key. Likewise, when the managed VPC 130 transmits data to the POP 120A, the managed VPC 130 may use the public key provided in the digital certificate of the POP 120A to encrypt the transmitted data. The POP 120A can then decrypt the data using its private key.

At some later time, the POP 120A network address may change at (5). However, because the secure connection between the POP 120A and the managed VPC 130 is established using the digital certificates, the network address change may not interrupt the secure connection. Thus, the POP 120A and the managed VPC 130 can continue to send data via the secure connection at (6).

In addition, a new POP 120B may be created at (7). In response to the creation or set up of the new POP 120B, the control plane 310 can transmit a digital certificate to the new POP 120B at (8). The POP 120B may sign the digital certificate at (9) and the POP 120B and the managed VPC 130 can exchange digital certificates to establish a secure connection at (10).

Example File Retrieval Routine

Figure 4:
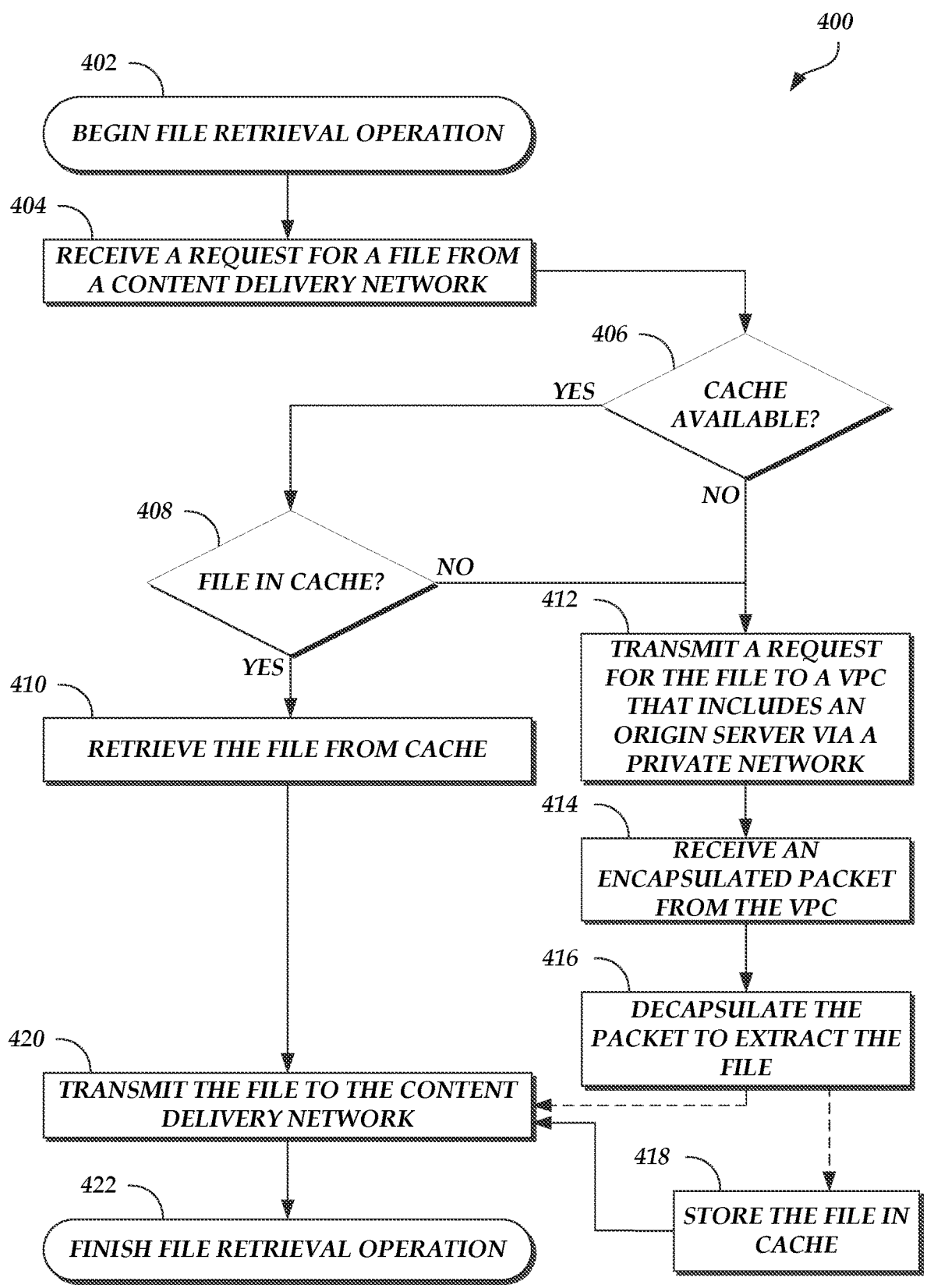
FIG. 4 is a flow diagram depicting a file retrieval routine illustratively implemented by a managed VPC, according to one embodiment.

FIG. 4 is a flow diagram depicting a file retrieval routine 400 illustratively implemented by a managed VPC, according to one embodiment. As an example, the managed VPC 130 (e.g., the server 132 and the communication manager 136) of FIG. 1 can be configured to execute the file retrieval routine 400. The file retrieval routine 400 begins at block 402.

At block 404, a request for a file is received from a content delivery network. For example, a user device 102 may have requested the file from the CDN service 122. The CDN service 122, however, may have experienced a cache miss (e.g., the file was not stored in the cache data store 126). Thus, the CDN service 122 has forwarded the request to the server 132 in the managed VPC 130.

At block 406, a determination is made as to whether a cache is available in the managed VPC 130. The cache data store 134 is optional and may or may not be present in the managed VPC 130. For example, if the cache data store 134 is available or present, then the requested file may be stored therein and can be used to satisfy the request. If the cache data store 134 is available in the managed VPC 130, then the file retrieval routine 400 proceeds to block 408. Otherwise, if the cache data store 134 is not available in the managed VPC 130, then the file retrieval routine 400 proceeds to block 412.

At block 408, a determination is made as to whether the file is stored in the cache of the managed VPC 130 (e.g., the cache data store 134). If the file is stored in the cache data store 134, then the file retrieval routine 400 proceeds to block 410. Otherwise, if the file is not stored in the cache data store 134 (e.g., another cache miss occurred), then the file retrieval routine 400 proceeds to block 412.

At block 410, the file is retrieved from the cache of the managed VPC 130. The file may be present in the cache data store 134 and not the cache data store 126 because the cache data store 134 may serve as a mid-tier cache that has more storage capacity than the cache data store 126.

At block 412, a request for the file is transmitted to a VPC that includes an origin server via a private network. For example, the file request is transmitted to the third party VPC 140 via the private network 115. The file request may be encapsulated in a header that points to a location of the third party VPC 140 to enable the transmission. As described above, before the request is received, the managed VPC 130 and the third party VPC 140 may be paired using their respective VPC identifiers.

At block 414, an encapsulated packet is received from the third party VPC. The packet may be encapsulated with a header that points to a location of the managed VPC 130. The packet may be encapsulated as a result of the origin server 142 generating a packet for transmission to the server 132. The encapsulated packet may be received via the private route established between the managed VPC 130 and the third party VPC 140.

At block 416, the encapsulated packet is decapsulated to extract the packet and/or file. For example, the file may be located in the data portion of the packet. After the packet is decapsulated, the file retrieval routine 400 proceeds either to block 418 (e.g., if the cache data store 134 is present in the managed VPC 130) or to block 420 (e.g., if the cache data store 134 is not present in the managed VPC 130 or it is otherwise not desired to store the retrieved file in cache).

At block 418, the retrieved file is stored in cache. For example, the file can be stored in the cache data store 134 such that the next time a request is received for the file, the managed VPC 130 can return the file stored in the cache data store 134 in place of submitting a request to the third party VPC 140 for the file. After the retrieved file is stored in cache, the file retrieval routine 400 proceeds to block 420.

At block 420, the file is transmitted to the content delivery network. The transmitted file may be retrieved from the cache data store 134 or the third party VPC 140. The CDN service 122 may then distribute the file to the user device 102 that originally requested the file. After the file is transmitted to the content delivery network, the file retrieval routine 400 may be complete, as shown in block 422.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
receiving, by a virtual private cloud network (VPC), a request for content from a first system via a public network;
determining, by the VPC, that the requested content is not stored in a cache data store;
encapsulating, for transmission over a private network that allows communication between the VPC and one or more virtual computing devices arranged within a virtualized local area network, a second request for the requested content in a first header that points to an identifier associated with a network of the one or more virtual computing devices arranged within the virtualized local area network, wherein the second request is different from the request, wherein the second request is not received from the first system, wherein the one or more virtual computing devices hide an address of an origin server from devices in communication with the public network, wherein hiding the address of the origin server prevents devices in communication with the public network from addressing a communication to the origin server, wherein the one or more virtual computing devices are each assigned an address for communication over the private network, wherein the address assigned to each of the one or more virtual computing devices is different from an IPv4 address, and wherein the address assigned to each of the one or more virtual computing devices is different from an IPv6 address;
transmitting, by the VPC, the encapsulated request for the content to the one or more virtual computing devices via a private route established between the VPC and the one or more virtual computing devices over the private network;
receiving, by the VPC via the private route, an encapsulated packet from the one or more virtual computing devices, wherein the encapsulated packet comprises a second header that points to an identifier of the VPC;
decapsulating, by the VPC, the encapsulated packet to extract the content; and
transmitting, by the VPC, the content to the first system via the public network.

2. The computer-implemented method of claim 1, wherein receiving the request for the content further comprises receiving the request for the content from the first system via an encrypted connection through the public network.

3. The computer-implemented method of claim 2, further comprising exchanging signed digital certificates with the first system to establish the encrypted connection.

4. The computer-implemented method of claim 1, wherein the VPC is paired with the one or more virtual computing devices using the identifier of the VPC and the identifier associated with the network of the one or more virtual computing devices.

5. The computer-implemented method of claim 1, wherein the VPC and the one or more virtual computing devices are located in a same geographic location.

6. The computer-implemented method of claim 1, further comprising:
receiving a request for second content from the first system;
determining that the requested second content is stored in a cache data store;
retrieving the second content from the cache data store; and
transmitting the second content to the first system.

7. A system comprising:
a first computing device; and
one or more second computing devices that implement a virtual private cloud network (VPC), wherein the one or more second computing devices comprise a processor configured with specific computer-executable instructions to cause the VPC to:
process a request for content received from the first computing device via a first network;
encapsulate, for transmission over a private network that allows communication between the VPC and one or more virtual computing devices arranged within a virtualized local area network, a second request for the requested content in a first header that points to an identifier associated with a network of the one or more virtual computing devices arranged within the virtualized local area network, wherein the second request is different from the request, wherein the second request is not received from the first computing device, wherein the one or more virtual computing devices hide an address of an origin server from devices in communication with the first network, wherein hiding the address of the origin server prevents devices in communication with the first network from addressing a communication to the origin server, wherein the one or more virtual computing devices are each assigned an address for communication over the private network, wherein the address assigned to each of the one or more virtual computing devices is different from an IPv4 address, and wherein the address assigned to each of the one or more virtual computing devices is different from an IPv6 address;

transmit the encapsulated request for the content to the one or more virtual computing devices via a private route established between the VPC and the one or more virtual computing devices over the private network;

receive an encapsulated packet from the one or more virtual computing devices, wherein the encapsulated packet comprises a second header that points to an identifier of the VPC;

decapsulate the encapsulated packet to extract the content; and transmit the content to the first computing device via the first network.

8. The system of claim 7, wherein the request for the content is received via an encrypted connection through the first network.

9. The system of claim 8, wherein the one or more second computing devices are further configured with specific computer-executable instructions to cause the VPC to exchange signed digital certificates with the first computing device to establish the encrypted connection.

10. The system of claim 7, wherein the VPC is paired with the one or more virtual computing devices using the identifier of the VPC and the identifier associated with the network of the one or more virtual computing devices.

11. The system of claim 7, further comprising a cache data store, wherein the one or more second computing devices are further configured with specific computer-executable instructions to cause the VPC to:

process a third request for second content received from the first computing device via the first network;

determine that the requested second content is stored in the cache data store;

retrieve the second content from the cache data store; and transmit the content to the first computing device via the first network.

12. The system of claim 7, wherein the VPC and the one or more virtual computing devices are located in a same geographic location.

13. The system of claim 7, wherein the first network is a publicly accessible network.

14. Non-transitory, computer-readable storage media comprising computer-executable instructions for retrieving a resource, wherein the computer-executable instructions, when executed by a computer system that implements a virtual private cloud network (VPC), cause the computer system to:

receive a request for content from a second computer system via a first network;

encapsulate, for transmission over a private network that allows communication between the VPC and one or more virtual computing devices arranged within a virtualized local area network, a second request for the requested content in a first header that points to an identifier associated with a network of the one or more virtual computing devices arranged within the virtualized local area network, wherein the second request is different from the request, wherein the second request is not received from the first network, wherein the one or more virtual computing devices hide an address of an origin server from devices in communication with the first network, wherein hiding the address of the origin server prevents devices in communication with the first network from addressing a communication to the origin server, wherein the one or more virtual computing devices are each assigned an address for communication over the private network, wherein the address assigned to each of the one or more virtual computing devices is different from an IPv4 address, and wherein the address assigned to each of the one or more virtual computing devices is different from an IPv6 address;

transmit the encapsulated request for the content to the one or more virtual computing devices via a private route established between the VPC and the one or more virtual computing devices over the private network;

receive an encapsulated packet from the one or more virtual computing devices, wherein the encapsulated packet comprises a second header and the content, wherein the second header points to an identifier of the VPC;

decapsulate the encapsulated packet to extract the content; and transmit the content to the second computer system via the first network.

15. The non-transitory, computer-readable storage media of claim 14, wherein the computer-executable instructions further cause the computer system to receive the request via an encrypted connection through the first network.

16. The non-transitory, computer-readable storage media of claim 15, wherein the computer-executable instructions further cause the computer system to exchange signed digital certificates with the second computer system to establish the encrypted connection.

17. The non-transitory, computer-readable storage media of claim 14, wherein the VPC is paired with the one or more virtual computing devices using the identifier of the VPC and the identifier associated with the network of the one or more virtual computing devices.

18. The non-transitory, computer-readable storage media of claim 14, wherein the computer-executable instructions further cause the computer system to:

receive a request for a second resource from the second computer system via the first network;

determine that the requested second resource is stored in a cache data store;

retrieve the second resource from the cache data store; and transmit the resource to the second computer system via the first network.

19. The non-transitory, computer-readable storage media of claim 14, wherein the VPC and the one or more virtual computing devices are located in a same geographic location.

20. The non-transitory, computer-readable storage media of claim 14, wherein the first network is a publicly accessible network.

* * * * *